United States Patent
Furuya

(10) Patent No.: US 9,720,621 B2
(45) Date of Patent: Aug. 1, 2017

(54) STORAGE CONTROLLER, STORAGE SYSTEM, AND NON-TRANSITORY COMPUTER-READABLE STORAGE MEDIUM HAVING STORED THEREIN CONTROL PROGRAM

(71) Applicant: FUJITSU LIMITED, Kawasaki-shi, Kanagawa (JP)

(72) Inventor: Masanori Furuya, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 91 days.

(21) Appl. No.: 14/287,244

(22) Filed: May 27, 2014

(65) Prior Publication Data
US 2014/0380005 A1 Dec. 25, 2014

(30) Foreign Application Priority Data
Jun. 25, 2013 (JP) ................. 2013-132591

(51) Int. Cl.
*G06F 12/00* (2006.01)
*G06F 3/06* (2006.01)
*G06F 11/20* (2006.01)

(52) U.S. Cl.
CPC .............. *G06F 3/065* (2013.01); *G06F 3/067* (2013.01); *G06F 3/0619* (2013.01);
(Continued)

(58) Field of Classification Search
CPC ...... G06F 3/0647; G06F 3/065; G06F 3/0619; G06F 3/067; G06F 11/2056;
(Continued)

(56) References Cited

U.S. PATENT DOCUMENTS

2003/0126388 A1  7/2003  Yamagami
2005/0210314 A1* 9/2005  Iguchi ................. G06F 11/1456
                                                      714/6.31
(Continued)

FOREIGN PATENT DOCUMENTS

JP  2003-248606  9/2003
JP  2010-160764  7/2010

OTHER PUBLICATIONS

Extended European Search Report dated Sep. 4, 2014 for corresponding European Patent Application No. 14169631.0, 11 pages.
(Continued)

*Primary Examiner* — Shawn X Gu
(74) *Attorney, Agent, or Firm* — Fujitsu Patent Center

(57) ABSTRACT

A storage controller performing a copy process in which data stored in a copy source storage area is copied to a copy destination storage area, the storage controller includes a processor, wherein the processor receives a transfer command for giving an instruction for transferring data stored in a first area of the copy source storage area to a second area of the copy source storage area, starts a transfer process in which transfer data from the first area is read and is written into the second area in accordance with reception of the transfer command, and starts copying the transfer data into a corresponding area of the copy destination storage area that corresponds to the second area in the copy process together with the starting of the transfer process.

8 Claims, 31 Drawing Sheets

(52) U.S. Cl.
CPC ........ *G06F 3/0647* (2013.01); *G06F 11/2064* (2013.01); *G06F 11/2069* (2013.01); *G06F 11/2071* (2013.01); *G06F 11/2056* (2013.01); *G06F 11/2082* (2013.01)

(58) Field of Classification Search
CPC ............. G06F 11/2064; G06F 11/2069; G06F 11/2071; G06F 11/2082
See application file for complete search history.

(56) References Cited

U.S. PATENT DOCUMENTS

2006/0212668 A1* 9/2006 Furukawa ............ G06F 11/2064
711/162
2010/0180094 A1* 7/2010 Min .................... G06F 11/2058
711/162

OTHER PUBLICATIONS

Japanese Office Action mailed on Jan. 24, 2017 for corresponding to Japanese Patent Application No. 2013-132591, with Partial English Translation, 7 pages.

\* cited by examiner

STORAGE CONTROLLER, STORAGE SYSTEM, AND NON-TRANSITORY COMPUTER-READABLE STORAGE MEDIUM HAVING STORED THEREIN CONTROL PROGRAM

CROSS-REFERENCE TO RELATED APPLICATION

This application is based upon and claims the benefit of priority of the prior Japanese Patent Application No. 2013-132591, filed on Jun. 25, 2013, the entire contents of which are incorporated herein by reference.

FIELD

The present invention relates to a storage controller, a storage system, and a non-transitory computer-readable storage medium having stored therein a control program.

BACKGROUND

A data transfer process in a storage apparatus is performed by a server reading transfer data from a transfer source volume (storage area) and writing the read transfer data into a transfer destination volume (storage area).

Recently, in order to suppress the load of a server or the congestion of a communication line, information processing apparatuses such as servers having an offloaded data transfer function for causing a storage apparatus to perform a transfer process of data stored in the storage apparatus are known. As the offloaded data transfer function, for example, there is an Offloaded Data Transfer (ODX) mounted in Windows (registered trademark) Server 2012 of Microsoft (registered trademark) Corp. According to the ODX, an ODX command issued from a server is received, and a storage apparatus performs a data transfer process as a main body.

In the data transfer process according to the ODX, logically, the storage apparatus completes the transfer at a moment and returns a response to an ODX command to the server, and, physically, the storage apparatus transfers transfer data on the background. In addition, when a data access to an area of the transfer source/transfer destination of the ODX is made, the storage apparatus performs a so-called copy-on write/copy-on read operation in which, before a data access is made, transfer data of an update area relating to the data access is transferred. In this way, according to the ODX, a snapshot is generated by the storage apparatus, and the transfer (copy) is viewed to be completed at a moment from the server.

FIG. 29 is a diagram that illustrates an example of a data transfer process performed in a storage apparatus according to the ODX. As illustrated in FIG. 29, when a file (data) stored in the storage apparatus is copied, a server as a host apparatus issues a populate token that represents the range (area) of a transfer source and a write using token that represents the range (area) of a transfer destination. The storage apparatus performs a transfer process based on the above-described command received from the host apparatus.

Hereinafter, a transfer process that is started (initiated) inside the storage apparatus will be referred to as an ODX session, and two commands including the populate token and the write using token issued from the host apparatus will be collectively referred to as ODX commands (transfer commands).

Meanwhile, in a storage system including a plurality of storage apparatuses, as a technique for making a data backup, a remote equivalent copy (REC) is known. The REC is a function for mirroring data between storage apparatuses (between casings).

FIG. 30 is a diagram that illustrates an example of a data copy process between storage apparatuses according to the REC. According to the REC, an REC session is started (initiated) in accordance with a start (initiation) command from a host apparatus. In the REC session, a copy source volume (storage area) of the storage apparatus is in a copy processing state, and an equivalent process is performed in which the data of the copy source volume is copied to a copy destination volume (storage area) of another storage apparatus. During the copy process, since the copy destination volume has incomplete data, the storage apparatuses of the copy destination/copy source do not perform a suspending process accompanied with a suspend command.

In the copy processing state and the equivalent state, information changed in the copy source is reflected on the copy destination. In addition, in the equivalent state, when a suspend command is issued from the host apparatus, the copy source and the copy destination are in a suspended state, and a snapshot (copy destination volume) is generated. In the suspended state, an update to the copy source is not reflected on the copy destination, and the host apparatus can access the copy destination volume.

In addition, in the REC, in a case where a copy source storage apparatus is damaged (broken down) in the equivalent state, the host apparatus can continue the operation (failover) from the copy destination volume by issuing a suspend command to a copy destination storage device.

In copy modes supported by the REC, a synchronous mode and a consistency mode are included. Depending on such a copy mode, handling of write data relating to a write command at the time of receiving a write input/output (I/O) (write command) for a copy source volume from the host apparatus to the copy source storage apparatus differs.

The synchronous mode is an operation mode in which, in a case where the copy source storage apparatus receives a write command, write data relating to the write command is copied to the copy destination volume using the function of the REC, and then, a response to the write command is returned.

In the consistency mode, the copy source storage apparatus returns a response to the write command and then, stores the write data in a dedicated buffer (REC buffer). The write data stored in the REC buffer is gathered at the interval of several seconds and is transferred to the REC buffer of the copy destination storage apparatus, and the transferred write data is expanded in the copy destination volume from the REC buffer. In the consistency mode, since the copy source storage apparatus stores the write data in the REC buffer with the order of write commands being maintained, it is assured that all the write data up to a certain time point is reflected on the copy destination volume (protection of the order).

In addition, an EC in which mirroring such as the REC is performed inside the storage apparatus (inside the casing) is known. In the copy modes supported by the EC, a synchronous mode is included.

Furthermore, as another technology, there is a technology called transparent failover in storage apparatuses. According to this technology, mirroring is performed between storage apparatuses, and, in a case where one storage apparatus is damaged, automatic failover to the other storage apparatus is dynamically performed, and an access from the server is continued. According to the transparent failover, by maintaining a copy session in the same state in the storage apparatuses, a copy session after the failover is not manually reset, and, the copy session can be continued by a differential copy without re-performing an initial copy.

As a related technology, a technology for optimizing a backup process in a case where copy data acquired from a copy source is dually backed up in a copy destination is known (for example, see Japanese Laid-open patent publication No. 2010-160764).

FIG. 31 is a diagram that illustrates an example of a case where a copy source storage apparatus is broken down after a response to an ODX command in the copy source storage apparatus performing an REC. As illustrated in FIG. 31, when an ODX command is received from a host apparatus (see arrow (1)), the copy source (storage apparatus) of the REC starts an ODX session (see arrow (2)). Then, when logical transfer relating to the ODX command is completed, the copy source returns a response to the ODX command (see arrow (3)). At a time point when the copy source returns the response to the host apparatus, physical transfer of transfer data relating to the ODX command has not been completed in the ODX session, and the copy source and the copy destination are in a non-equivalent state as physical data.

At this time, a case will be considered in which a breakdown occurs in the copy source storage apparatus (see arrow (4)). In such a case, the host apparatus issues a suspend command to the copy destination (storage apparatus) of the REC. When the suspend command is received (see arrow (5-1)), the copy destination suspends an equivalent state being equivalent to the copy source (see arrow (5-2)) and returns a response to the host apparatus (arrow (5-3)).

In order to restore the copy source, the host apparatus issues a read I/O (read command) to the copy destination to which data of the copy source has been copied according to the REC. At this time, in the read command, a read instruction of the copy destination transfer data of the copy destination that corresponds to the transfer data of the copy source is also included. When the read command is received (see arrow (6)), the copy destination reads the copy transfer data designated in the read command and responses to the host apparatus (see arrow (7)).

However, since the transfer process according to the ODX is incomplete in the copy source, the copy of the transfer data to the copy destination according to the REC is also incomplete. Accordingly, even when an area designated in the read command of the copy destination is accessed, no copy destination transfer data is present, and accordingly, the reading operation fails or other data is read, and it is difficult to read the copy destination transfer data and to respond to the host apparatus.

In this way, in the copy source storage apparatus that performs the REC, in a case where the copy source storage apparatus is broken down after responding to the ODX command, it is difficult to acquire copy transfer data from the copy destination storage apparatus by host apparatus. Accordingly, there is a problem in that it is difficult to restore the copy destination storage apparatus based on the latest data by the host apparatus.

Until now, while both the volumes (storage areas) of the transfer source and the transfer destination of the transfer process (for example, the ODX) performed in the copy source storage apparatus have been described to be volumes of the copy source according to the copy between casings (for example, the REC), the above-described problem is not limited thereto. For example, the above-described problem may similarly occur also in a case where at least the transfer destination of the transfer process is the volume of the copy source according to the inter-casing copy. In addition, the above-described problem may similarly occur in a case where the volume of the copy source is broken down also in the storage apparatus that makes a copy between casings (for example, the EC). Furthermore, the above-described problem may similarly occur also in a case where the storage area of the transfer source and the storage area of the transfer destination of the transfer process are areas of the same volume (in a case where data transfer is performed within the volume).

SUMMARY

According to an aspect of the embodiments, a storage controller performing a copy process in which data stored in a copy source storage area including one or more storage volumes is copied to a copy destination storage area including one or more storage volumes corresponding to the copy source storage area. The storage controller includes a processor, wherein the processor: receives a transfer command for giving an instruction for transferring data stored in a first area of the copy source storage area to a second area of the copy source storage area from an information processing apparatus; starts a transfer process in which transfer data from the first area is read and is written into the second area in accordance with reception of the transfer command; and starts copying the transfer data into a corresponding area of the copy destination storage area that corresponds to the second area in the copy process together with the starting of the transfer process.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments will be described with reference to the drawings.

[1] First Embodiment

[1-1] Example of Configuration of Storage System

Figure 1:
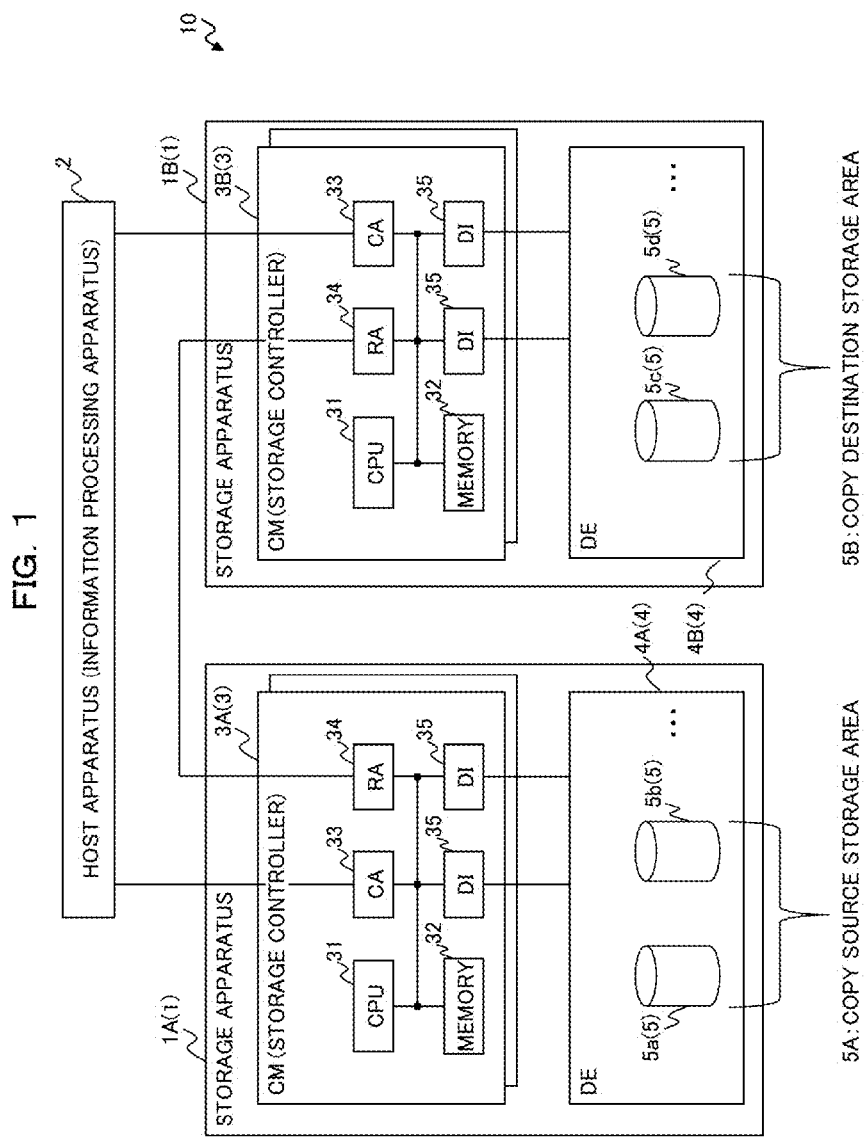
FIG. 1 is a diagram that illustrates an example of the configuration of a storage system as an example of a first embodiment.
Figure 2:
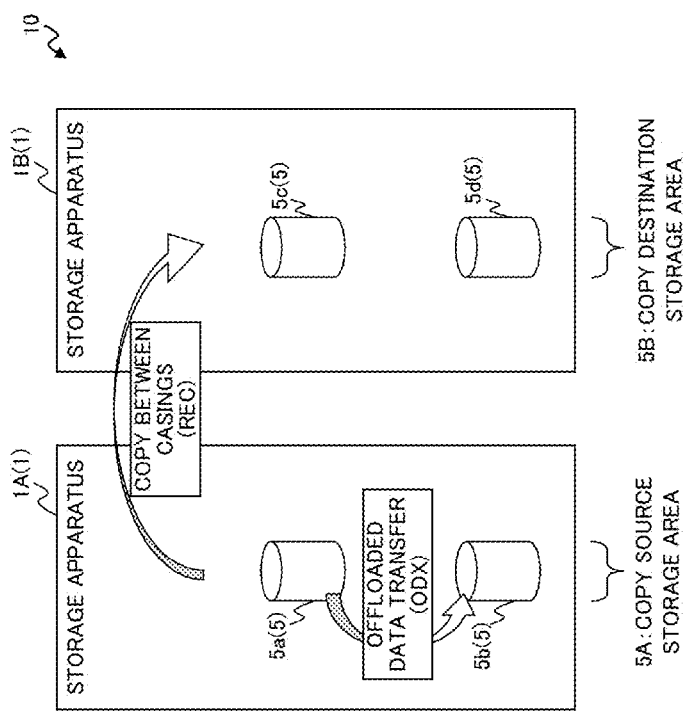
FIG. 2 is a diagram that illustrates an example of the appearance of a backup according to the storage system illustrated in FIG. 1.

FIG. 1 is a diagram that illustrates an example of the configuration of a storage system 10 as an example of a first embodiment, and FIG. 2 is a diagram that illustrates an example of the appearance of a backup according to the storage system 10 illustrated in FIG. 1.

As illustrated in FIG. 1, the storage system 10 is connected to a host apparatus 2, receives various requests from the host apparatus 2, and performs various processes according to the requests.

The host apparatus 2 is a host computer (high-level apparatus) connected to the storage system 10 and, for example, executes an operating system (OS) that supports an offloaded data transfer function (ODX) of Windows Server 2012 or the like. Examples of the host apparatus 2 include various information processing apparatuses such as a personal computer (PC), a server, and a mainframe.

The host apparatus 2 issues an ODX command (transfer command) and an EC/REC command (copy command) to the storage system 10 and issues a write (update)/read command and the like for volumes 5a to 5d. As examples of the EC/REC command, there are a start (initiation) command, a suspend command, a resume command used for a transition from a suspended state to an equivalent state, and the like.

The storage system 10 includes one or more (two in the case illustrated in FIG. 1) storage apparatuses 1A and 1B (in a case where the storage apparatuses 1A and 1B do not need to be discriminated from each other, one thereof will be simply referred to as a storage apparatus 1).

The storage apparatus 1A includes one or more (two in the case of FIG. 1) controller modules (CM) 3A and a disk enclosure (hereinafter, referred to as a DE) 4A. The storage apparatus 1B includes one or more (two in the example illustrated in FIG. 1) CMs 3B and a DE 4B. Hereinafter, in a case where the CMs 3A and 3B do not need to be discriminated from each other, one thereof will be simply referred to as a CM 3. In addition, in a case where the DEs 4A and 4B do not need to be discriminated from each other, one thereof will be simply referred to as a DE 4.

The DE 4 houses (manages) one or more (two in the case of FIG. 1) volumes 5a and 5b or 5c and 5d. Hereinafter, in a case where the volumes 5a to 5d do not need to be discriminated from one another, one thereof will be simply referred to as a volume 5. The volume (a storage area or a storage volume) 5 is a unit in which a storage area is managed physically or logically as one continuous storage area by the host apparatus 2 or the CM 3.

Hereinafter, in an REC session, a volume (storage area) of a copy source will be referred to as a copy source storage area 5A, and a volume (storage area) of a copy destination will be referred to as a copy destination storage area 5B. In the example illustrated in FIG. 2, volumes 5a and 5b (at least a volume 5b) of the storage apparatus 1A represent the copy source storage area 5A, and volumes 5c and 5d (at least a volume 5d) of the storage apparatus 1B represent the copy destination storage area 5B.

Here, the copy source storage area 5A (the volumes 5a and 5b) and the copy destination storage area 5B (the volumes 5c and 5d) may be physical volumes or logical (virtual) volumes.

For example, the copy source storage area 5A represents one or more physical or logical (virtual) volumes (first volume) out of a plurality of volumes realized by a storage apparatus 41 (see FIG. 3) included in the DE 4A. Similarly, the copy destination storage area 5B represents one or more physical or logical (virtual) volumes (second volume) out of a plurality of volumes realized by the storage apparatus 41 included in the DE 4B.

The CM (storage controller) 3 is a computer (information processing apparatus) that is connected to the host apparatus 2, the DE 4, and the other CM 3 and manages resources of the storage apparatus 1. The CM 3 performs various processes (a data transfer process, a data copy process, a data write/read process, and the like) for the DE 4 in accordance with requests from the host apparatus 2 and the other CM 3.

In the following description, the CM 3 will be described to receive an ODX command, an REC command (copy command), and a read/write command from the host apparatus 2 and perform processes according to the received commands.

As illustrated in FIG. 2, in an ODX session (transfer process) started (initiated) in accordance with the ODX command, the CM 3 performs offloaded transfer in which data stored in the volume 5*a* (first area) within the copy source storage area 5A is read and is written into the volume 5*b* (second area). In addition, as illustrated in FIG. 2, in the REC session (copy process) started (initiated) in accordance with the REC command, the CM 3 (storage apparatus 1) makes a copy (between casings) between devices in which data stored in the copy source storage area 5A is copied into the corresponding copy destination storage area 5B.

[1-2] Hardware Configuration

Figure 3:
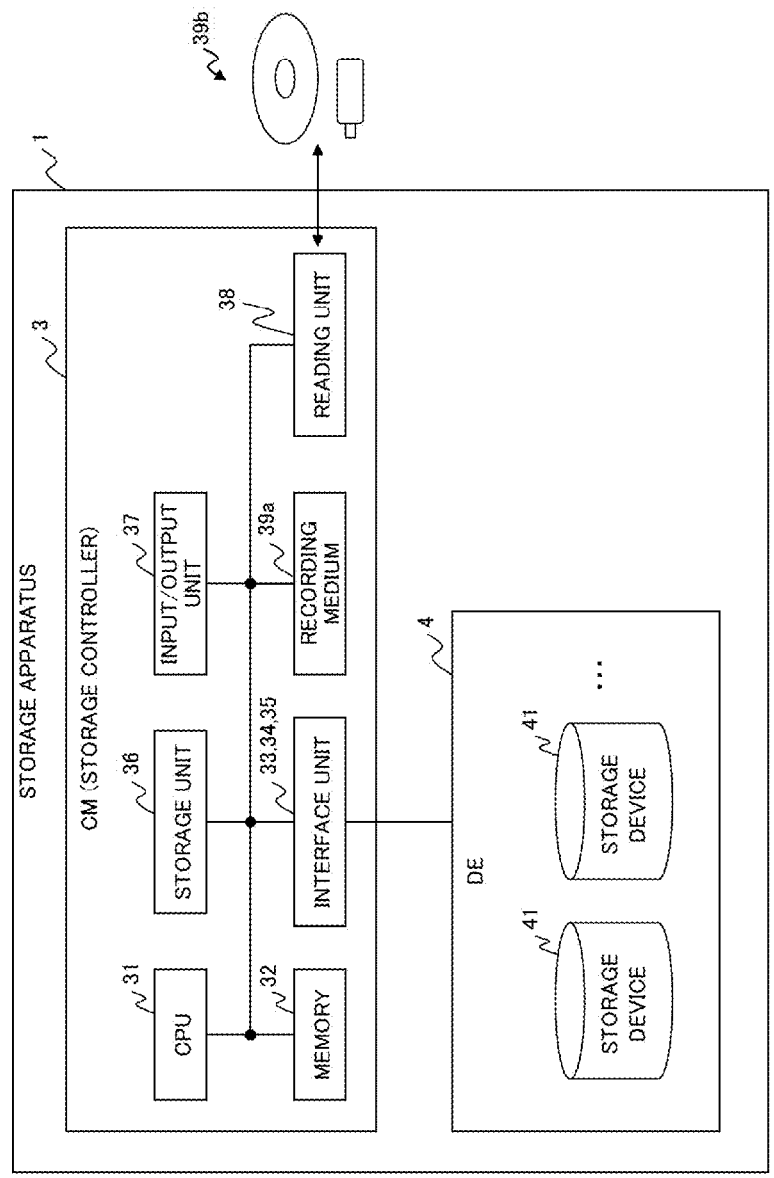
FIG. 3 is a diagram that illustrates an example of the hardware configuration of a storage apparatus illustrated in FIG. 1.

Next, the hardware configuration of the storage apparatus 1 will be described with reference to FIGS. 1 and 3. FIG. 3 is a diagram that illustrates an example of the hardware configuration of the storage apparatus 1 illustrated in FIG. 1.

The CM 3, as illustrated in FIGS. 1 and 3, is equipped with a central processing unit (CPU) 31, a memory 32, a channel adapter (CA) 33, a remote adaptor (RA) 34, and one or more (two in the case illustrated in FIG. 1) disk interfaces (DI) 35. In addition, as illustrated in FIG. 3, the CM 3 may be equipped with a storage unit 36, an input/output unit 37, a reading unit 38, and a recording medium 39*a*.

The CPU 31 is an arithmetic processing unit (processor) that is connected to blocks 31 to 39*a* disposed inside the CM 3 and performs various control processes and arithmetic operations. The CPU 31 realizes various functions of the CM 3 by executing programs (firmware) stored in the memory 32, the storage unit 36, the storage (recording) medium 39*a*, the DE 4, a read only memory (ROM) not illustrated in the figure, and the like. Here, the processor is not limited to the CPU 31 but, an electronic circuit such as a micro processing unit (MPU) may be used as the processor.

The memory 32 is a storage apparatus such as a cache memory that stores various kinds of data and programs. When a program is to be executed, the CPU 31 stores and expands data or a program in the memory 32. For example, the memory 32 temporarily stores a program used by the CPU 31 for serving as a storage controller, data to be written into the DE 4 from the host apparatus 2, data read from the DE 4 to the host apparatus 2 or the other CM 3, and the like. As the memory 32, for example, there is a volatile memory such as a random access memory (RAM).

The CA 33 is an adapter that is connected to the host apparatus 2 and controls interface with the host apparatus 2 and performs data communication with the host apparatus 2. The RA 34 is a port that is connected to the RA 34 disposed inside the other storage apparatus 1 (CM 3) and controls interface with the other storage apparatus 1 and, for example, performs data communication with the other storage apparatus 1. The DI 35 controls interface with the DE 4 housed in the storage system 10 and performs data communication with the DE 4. In the example illustrated in FIG. 3, the CA 33, the RA 34, and the DI 35 are collectively represented as an interface unit.

The storage unit 36 is hardware that stores various kinds of data, programs, and the like. As examples of the storage unit 36, there are various devices including a magnetic disk device such as a hard disk drive (HDD), a semiconductor drive device such as a solid state drive (SSD), and a non-volatile memory such as a flash memory.

The input/output unit 37 includes at least one of an input device such as a mouse or a keyboard and an output device such as a display or a printer. The input/output unit 37 receives an operation instruction according to an operation of a supervisor or the like of the storage apparatus 1 through the input device and displays (outputs) a processing result acquired by the storage apparatus 1, an alert, or the like to the output device.

The storage medium 39*a* is a storage apparatus such as a flash memory or a ROM and records various kinds of data and programs. The reading unit 38 is a device that reads out data or a program stored (recorded) in a computer-readable storage (recording) medium 39*b* such as an optical disc or a universal serial bus (USB) memory.

In at least one of the storage media 39*a* and 39*b*, a control program realizing the function of the storage system 10 (CM 3) according to this embodiment may be stored. For example, the CPU 31 expands the control program input from the storage medium 39*a* or input from the storage medium 39*b* through the reading unit 38 in a memory device such as the memory 32 and executes the control program. In this way, the computer as the CM 3 realizes the function of the storage controller according to this embodiment by using the CPU 31.

The DE 4, as illustrated in FIG. 3, includes one or more (two in the case illustrated in FIG. 3) storage apparatuses 41.

The storage apparatus 41 is any one of various devices including a magnetic disk device such as an HDD and a semiconductor drive device such as an SSD and is hardware storing various kinds of data, programs, and the like.

The storage apparatus 41 realizes physical/logical volumes used as the copy source storage area 5A and the copy destination storage area 5B, as described above, through the management performed by the CM 3.

The above-described blocks 31 to 39*a* are connected to a bus so as to be communicable with one another. In addition, the storage apparatuses 1 (RAs 34), the host apparatus 2 and the CA 33, and the DI 35 and the DE 4 (storage apparatuses 41) are respectively connected so as to be communicable with each other through a LAN, a small computer system interface (SCSI), an InfiniBand (registered trademark), a fiber channel, or the like.

Here, the above-described hardware configuration of the storage apparatus 1 is merely an example. Accordingly, an increase/decrease in the hardware, division thereof, integration employing an arbitrary combination, or the like within the individual storage apparatus 1, the CM 3, or the DE 4 may be appropriately performed. In addition, the hardware of the CM 3 may be commonly used by a plurality of the CMs 3 in the storage apparatus 1.

[1-3] Storage System

Here, the storage system 10 according to the first embodiment will be simply described.

As described above, in the copy source storage apparatus performing the REC, in a case where the copy source storage apparatus is broken down after a response to an ODX command, it is difficult to acquire copy transfer data from the copy destination storage apparatus by the host apparatus.

In contrast to this, in the storage system 10 according to the first embodiment, in a case where an ODX command is received in the equivalent state according to the REC, the CM 3 of the copy source performs a physical data transfer process according to the ODX and a data copy process according to the REC before a response to the ODX command. In other words, the CM 3 of the copy source protects the equivalency of the copy source/copy destination according to the REC by performing an REC copy process in synchronization with a transfer process relating to the ODX command.

Accordingly, also in a case where the storage apparatus 1A or the copy source storage area 5A is broken down after the reception of the ODX command, the host apparatus 2 can restore the storage apparatus 1A or the copy source storage area 5A from the latest data stored in the copy destination storage area 5B.

In addition, in the storage system 10 according to the first embodiment, of the transfer source and the transfer destination (volumes 5a and 5b) of the ODX session in the copy source storage area 5A of the storage apparatus 1A, at least the transfer destination (volume 5b) may be the copy source of the REC session. In such a case, the volume 5d included in the copy destination storage area 5B of the storage apparatus 1B serves as the copy destination of the REC session.

[1-4] Configuration of Storage System

Figure 4:
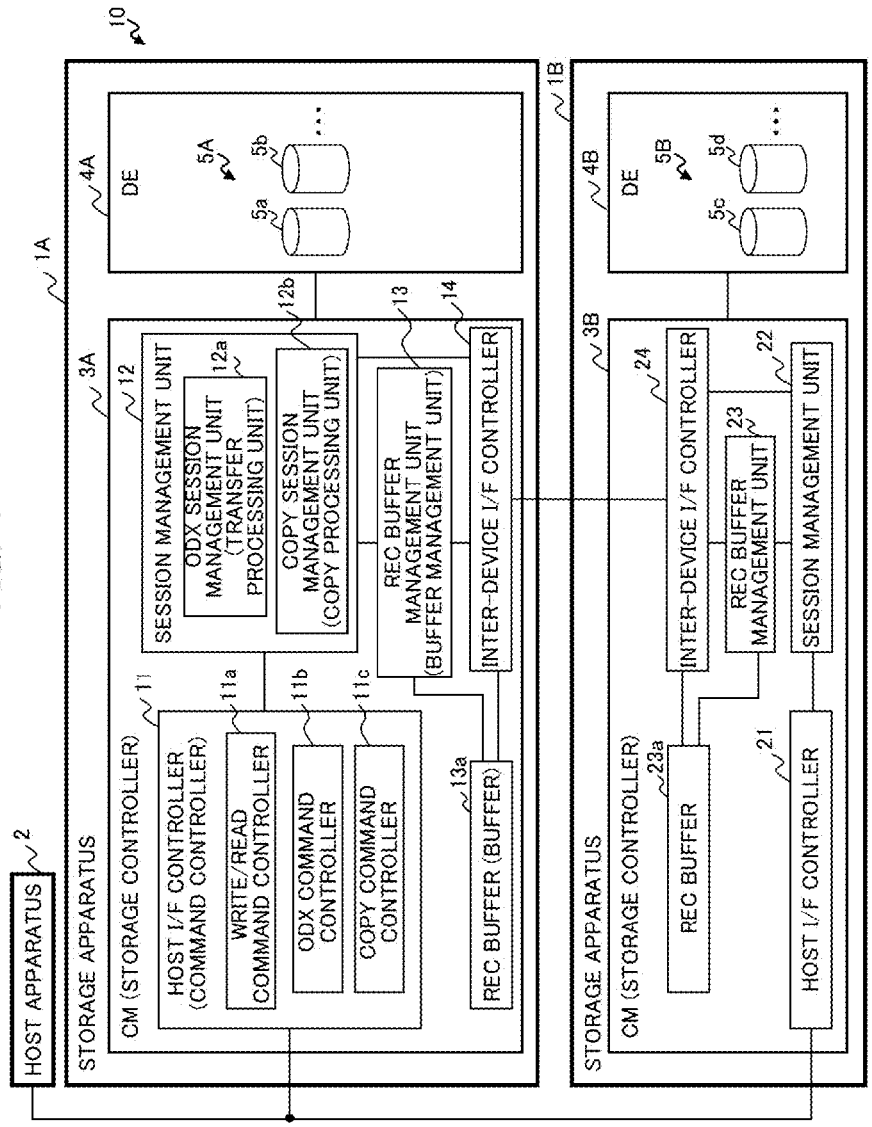
FIG. 4 is a diagram that illustrates an example of the functional configuration of the storage system illustrated in FIG. 1.

Next, the functional configuration of the storage system 10 illustrated in FIG. 1 will be described with reference to FIG. 4. FIG. 4 is a diagram that illustrates an example of the functional configuration of the storage system 10 illustrated in FIG. 1.

As illustrated in FIG. 4, the CM 3 has a configuration illustrated in the storage apparatus 1A for the function of the storage apparatus 1 of the copy source of the REC session and has a configuration as illustrated in the storage apparatus 1B for the function of the storage apparatus 1 of the copy destination of the REC session.

In the following description, the function of the storage system 10 relating to the ODX and the REC will be focused, and a case where the storage system 10 uses the synchronous mode out of copy modes of the REC and a case where the storage system 10 uses the consistency mode will be separately described.

[1-4-1] Configuration of Copy Source Storage apparatus

First, the configuration of the copy source storage apparatus 1A (CM 3A) will be described.

The CM 3A of the copy source storage apparatus 1A is equipped with: a host interface (I/F) controller 11; a session management unit 12; an REC buffer management unit 13; an REC buffer 13a; and an inter-device I/F controller 14.

The host I/F controller (command controller) 11 controls interface with the host apparatus 2 through the CA 33 and performs reception of various commands from the host apparatus 2, transmission of responses to various commands to the host apparatus 2, and the like. In addition, the host I/F controller 11 performs control according to a received command. Thus, the host I/F controller 11 is equipped with: a write/read command controller 11a; an ODX command controller 11b; and a copy command controller 11c.

The write/read command controller 11a performs control relating to the write/read commands received from the host apparatus 2.

For example, in a case where the REC is in the equivalent state, when a write command for the volume 5b is received, the write/read command controller 11a instructs the DE 4 to write data into the volume 5b through the DI 35. In addition, the write/read command controller 11a instructs the session management unit 12 to copy the write data according to the REC into the copy destination (volume 5d).

The ODX command controller 11b performs control relating to the ODX command received from the host apparatus 2.

For example, when an ODX command used for giving an instruction for the transfer of data (transfer data) stored in the volume 5a to the volume 5b is received, the ODX command controller 11b instructs the session management unit 12 to start an ODX session.

In addition, in the ODX session (transfer process) according to the ODX session management unit 12a, the ODX command controller 11b transmits a response including information relating to transfer data (transferable data) transferred within a response time for the ODX command to the host apparatus 2. The transferable data will be described later.

In addition, at least after physical transfer of the transferable data to the transfer destination is completed by the ODX session management unit 12a, the ODX command controller 11b transmits a response to the host apparatus 2.

The copy command controller 11c performs control relating to the REC command received from the host apparatus 2.

For example, when a start command of the REC is received, the copy command controller 11c instructs the copy session management unit 12b to start an REC session.

The REC buffer management unit (buffer management unit) 13 manages the REC buffer 13a used by the CM 3A in the consistency mode of the REC. For example, the REC buffer 13a is realized by at least some areas of the storage area of the memory 32.

For example, in a case where the REC is in the equivalent state, the REC buffer management unit 13 stores the transferable data in the REC buffer 13a within the response time in accordance with start of the copy that is made by the copy session management unit 12b. In addition, the REC buffer management unit 13 transmits (buffer transfer) the transferable data stored in the REC buffer 13a to the storage apparatus 1B at predetermined timing.

More specifically, when the transferable data to the copy destination (volume 5d) of the REC session is transferred from the copy session management unit 12b, the REC buffer management unit 13 stores the transferable data in the REC buffer 13a in the transferred order. Then, the REC buffer management unit 13 transmits the data stored in the REC buffer 13a to the storage apparatus 1B at predetermined timing such as timing when the data stored in the REC buffer 13a exceeds a predetermined size or at regular intervals.

In this way, in a case where the REC is in the equivalent state, the REC buffer management unit 13 transmits the transferable data to the copy destination (volume 5d) not in synchronization with writing of the transferable data to the transfer destination (volume 5b) according to the ODX session.

In addition, in a case where the REC is in the copy processing state, the REC buffer management unit 13 stores the transfer data written into the transfer destination (volume 5b) in accordance with the ODX session operating on the background in the REC buffer 13a. Furthermore, in a case where the REC is in the equivalent state or in the copy processing state, the REC buffer management unit 13 stores update data updated in the copy source storage area 5A in the REC buffer 13a.

The session management unit 12 manages sessions such as the ODX session and the REC session. In addition, the session management unit 12 stores management information used for managing the sessions in the memory 32 or the like and refers to or updates the management information. The session management unit 12 includes an ODX session management unit 12a and a copy session management unit 12b.

In a case where the REC is in the equivalent state, the ODX session management unit (transfer processing unit) 12a starts (initiates) an ODX session in which transfer data is read from the volume 5a that is the transfer source and is written into the volume 5b that is the transfer destination in accordance with reception of the ODX command.

More specifically, in the started ODX session, the ODX session management unit 12a reads transferable data that is at least a part of transfer data that is transferable within a response time for a transfer command from the volume 5a and writes the read data into the volume 5b. As information relating to the transferable data, there is information of the size of a transferred block, an area (for example, an address) in which the transferable data is stored, and the like. Here, the response time is a time that is predetermined in the specification of the ODX or by a supervisor of the host apparatus 2 or the storage system 10 or somebody else and, for example, is about several seconds.

Here, the ODX session management unit 12a transfers transfer data in units of blocks in the ODX session that is in the equivalent state. Here, the block is data (for example, a part of the transfer data) of a unitary size (for example, several Mbytes) out of the transfer data. When data of one block or several blocks is transferred, the ODX session management unit 12a determines whether or not the current time has arrived at a time limit of the response time. In a case where the current time has not arrived at the time limit, the ODX session management unit 12a transfers the next block. On the other hand, in a case where the current time has arrived at the time limit (time out), the ODX session management unit 12a stops the transfer of the block and notifies the ODX command controller 11b of the information of the total size of blocks (transferable data) transferred in the ODX session or the like.

Figure 31:
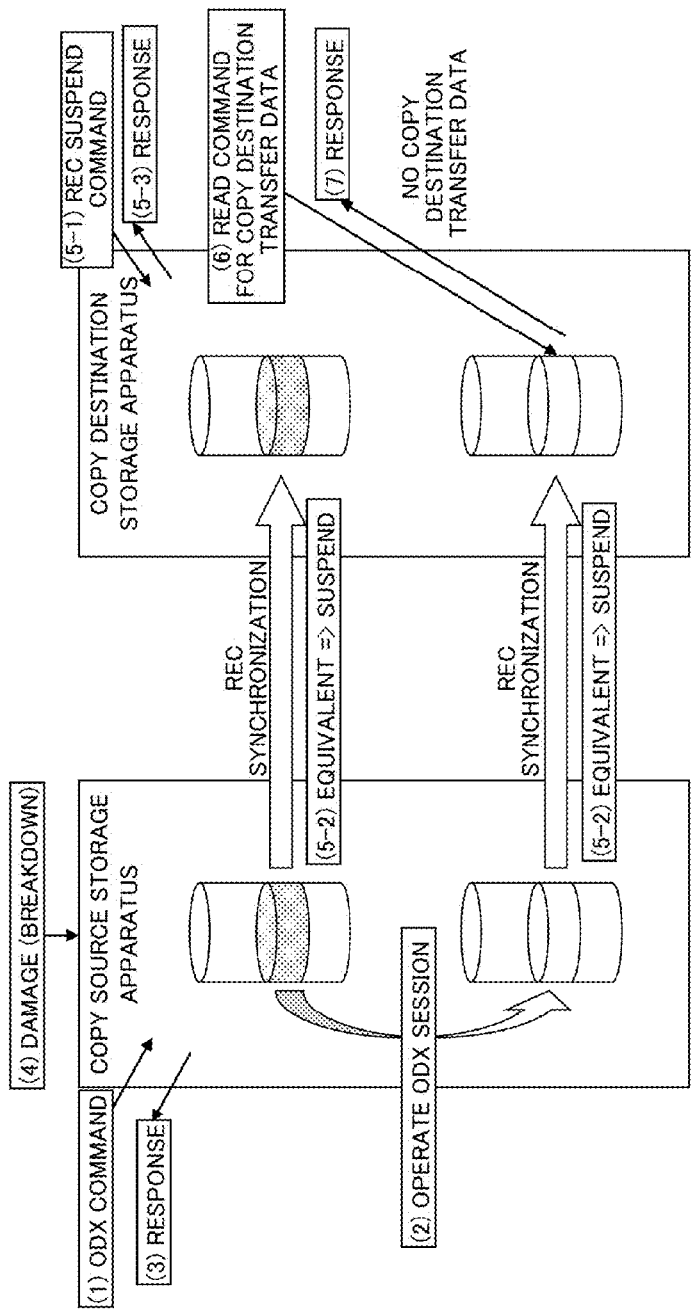
FIG. 31 is a diagram that illustrates an example of a case where a copy source storage apparatus is broken down after responding to an ODX command in a copy source storage apparatus performing the REC.

In addition, in the ODX session illustrated in FIG. 31, the transfer data is executed on the background after the transmission of the response to the host apparatus 2. However, in a case where the REC is in the equivalent state, the ODX session management unit 12a transfers the transferable data out of the transfer data within the response time. Accordingly, the host I/F controller 11 can notify the host apparatus 2 of the transferable data of which the physical transfer according to the ODX has been assuredly completed.

When the ODX command controller 11b returns the response to the host apparatus 2, the host apparatus 2 issues a new ODX command. The new ODX command is used for giving an instruction for transferring the data stored in the area of the volume 5a that has not been transferred by the ODX session management unit 12a to the volume 5b. The host apparatus 2 determines the areas (transfer ranges) of the transfer source and the transfer destination after update, which are included in the new ODX command, based on the information of the number of blocks and the like notified from the storage apparatus 1A.

Until the transfer process relating to all the areas designated in the ODX command is completed, the ODX session management unit 12a repeats the transfer process for each transferable data described above based on the new ODX command that is issued from the host apparatus 2 every time when a response is returned.

In addition, in a case where the REC is not in the equivalent state (for example, in the copy processing state), a case where the transfer destination of the ODX is not the copy source of the REC, or the like, the ODX session management unit 12a performs the process as illustrated in FIG. 31. In other words, the ODX session management unit 12a starts an ODX session in accordance with reception of an ODX command and transfers the transfer data on the background, and the ODX command controller 11b returns a response indicating the start of the ODX session.

The copy session management unit (copy processing unit) 12b manages an REC session.

For example, in a case where the REC is not in the equivalent state (for example, in the case of the copy processing state), the copy session management unit 12b copies data of the copy source storage area 5A into the corresponding copy destination storage area 5B in the REC session (copy process).

On the other hand, in a case where the REC is in the equivalent state, the copy session management unit 12b starts copying the transfer data into the volume 5d (corresponding area) of the copy destination storage area 5B corresponding to the transfer destination (the volume 5b of the copy source) of the ODX in the REC session (copy process) together with the start of the ODX session. In other words, the copy session management unit 12b starts copying the transfer data in the REC session by being triggered upon the start of the ODX session (reception of an ODX command).

More specifically, in a case where the REC is in the equivalent state, the copy session management unit 12b starts copying the transferable data into the volume 5d in the start process of the copy. Here, the copy started by the copy session management unit 12b is performed as below depending on the copy mode of the REC in the equivalent state which is the synchronous mode or the consistency mode.

Case of Synchronous Mode

In the case of the synchronous mode, the copy session management unit 12b copies data that is transferable within the response time into the volume 5d by using the function of the REC in the started copy.

In addition, in the case of the synchronous mode, after the ODX session of the transferable data to the transfer destination that is performed by the ODX session management unit 12a and the copying of the transferable data to the REC copy destination that is performed by the copy session management unit 12b are completed, the ODX command controller 11b transmits a response to the host apparatus 2.

Case of Consistency Mode

In the case of the consistency mode, the copy session management unit 12b transfers the transferable data that is transferable to the volume 5d to the REC buffer management unit 13 by using the function of the REC in the started copy and instructs the REC buffer management unit 13 to store the transferable data into the REC buffer 13a. The transferable data stored in the REC buffer 13a, as described above, is transmitted to the volume 5d at predetermined timing by the REC buffer management unit 13.

In addition, in the case of the consistency mode, the ODX command controller 11b transmits a response to the host apparatus 2 after completion of the ODX session of the transferable data for the transfer destination that is performed by the ODX session management unit 12a and the storage of the transferable data into the REC buffer 13a that is performed by the REC buffer management unit 13.

Furthermore, in a case where a suspend command is received before buffer transfer performed by the REC buffer management unit 13, the copy session management unit 12b waits (blocking control) for the process of changing the state to the suspended state until the buffer transfer of all the data stored in the REC buffer 13a is performed.

The inter-device I/F controller 14 controls interface with the storage apparatus 1B through the RA 34. For example, the inter-device I/F controller 14 transmits information of data, a command, and the like relating to the REC session or the like transmitted from the copy session management unit 12b or the REC buffer management unit 13 to the storage apparatus 1B. In addition, the inter-device I/F controller 14 receives information of the response and the like relating to the REC session or the like from the storage apparatus 1B and transfers the received information to the copy session management unit 12b or the REC buffer management unit 13.

As above, in the synchronous mode, after the physical transfer of the transferable data according to the ODX and the copy of the transferable data according to the REC are completed, the ODX command controller 11b returns a response to the host apparatus 2. Accordingly, in the response to the host apparatus 2, the synchronization (equivalent state) between the copy source storage area 5A and the copy destination storage area 5B can be reliably protected.

In addition, in the consistency mode, after the physical transfer of the transferable data according to the ODX and the storing of the transferable data in the REC buffer 13a according to the REC are completed, the ODX command controller 11b returns a response to the host apparatus 2. Accordingly, in the response to the host apparatus 2, the synchronization between the copy source storage area 5A and the copy destination storage area 5B can be protected at a level that is allowed in the consistency mode that is an asynchronous copy mode.

[1-4-2] Configuration of Copy Destination Storage Apparatus

Next, the configuration of the copy destination storage apparatus 1B (CM 3B) will be described.

The CM 3B of the copy destination storage apparatus 1B is equipped with: a host I/F controller 21; a session management unit 22; an REC buffer management unit 23; an REC buffer 23a; and an inter-device I/F controller 24.

The host I/F controller 21 controls interface with the host apparatus 2 through the CA 33 and has the same function as that of the host I/F controller 11 of the CM 3A.

For example, when a suspend command of the REC is received from the host apparatus 2, the host I/F controller 21 instructs the session management unit 22 to stop the REC session.

The REC buffer management unit 23 manages the REC buffer 23a used by the CM 3B in the consistency mode of the REC. For example, the REC buffer 23a is realized by at least some areas of the storage area of the memory 32.

For example, in the consistency mode, the REC buffer management unit 23 stores data (transferable data) transmitted (buffer transfer) from the storage apparatus 1A in the REC buffer 23a. In addition, the REC buffer management unit 23, at predetermined timing that is the same as that of the REC buffer management unit 13, reads the data stored in the REC buffer 23a in units of blocks in the order of storage and transfers the read data to the session management unit 22.

The session management unit 22 manages a session such as the REC session. In addition, the session management unit 22 stores management information used for managing the session in the memory 32 or the like and refers to or updates the management information.

For example, in a case where the REC is in the copy processing state or the equivalent state, the session management unit 22 instructs the DE 4 to write the data of the copy source storage area 5A of the REC that is transmitted from the storage apparatus 1B into the corresponding copy destination storage area 5B. At this time, in the consistency mode, the session management unit 22 receives the data (transferable data) stored in the REC buffer 23a from the REC buffer management unit 23 and instructs the DE 4 to write the received data into the copy destination storage area 5B.

The inter-device I/F controller 24 controls interface with the storage apparatus 1A through the RA 34. For example, the inter-device I/F controller 24 transmits/receives information of data, a command, and the like relating to the REC session or the like to/from the storage apparatus 1A.

[1-5] Example of Operation of Storage System

Next, an example of the operation of the storage system 10 as an example of the first embodiment configured as described above will be described with reference to FIGS. 5 to 12.

Figure 5:
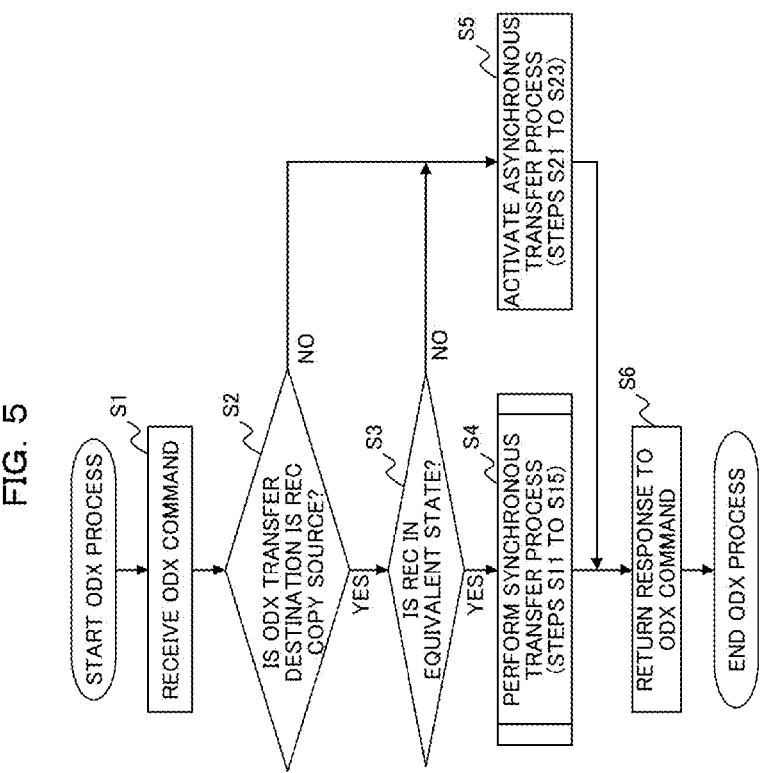
FIG. 5 is a flowchart that illustrates an example of the process in a case where a copy source storage apparatus illustrated in FIG. 4 receives an ODX command.
Figure 6:
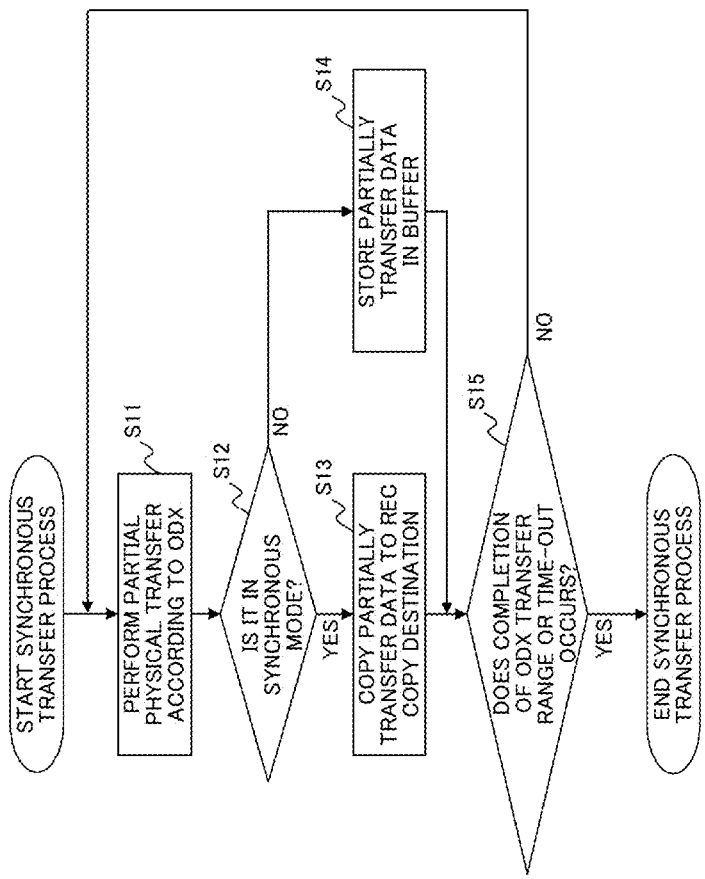
FIG. 6 is a flowchart that illustrates an example of a synchronous transfer process illustrated in FIG. 5.
Figure 7:
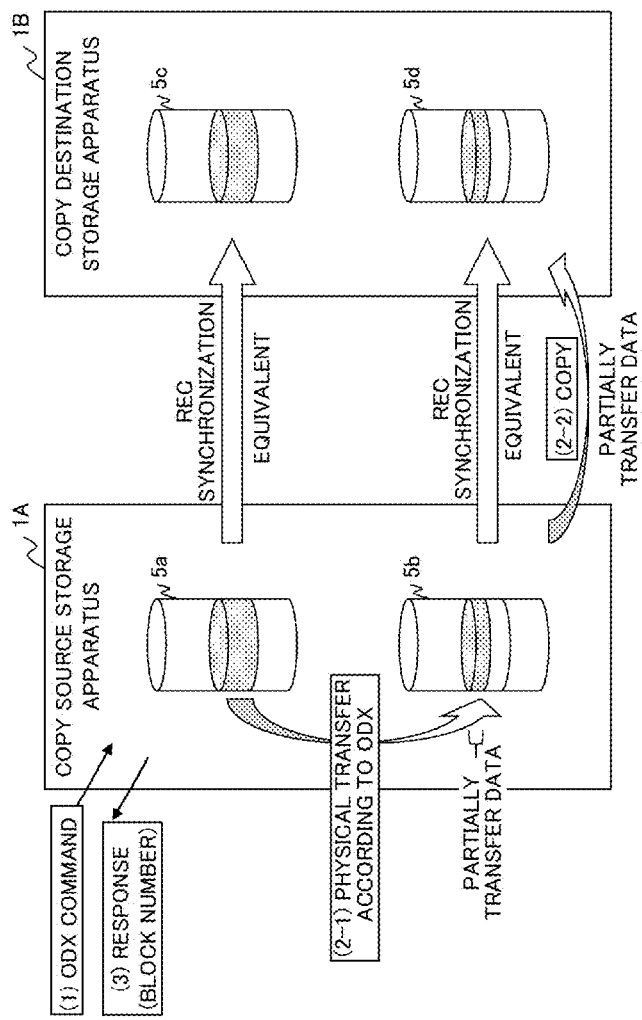
FIG. 7 is a diagram that illustrates a synchronous transfer process in the case of a synchronous mode.
Figure 8:
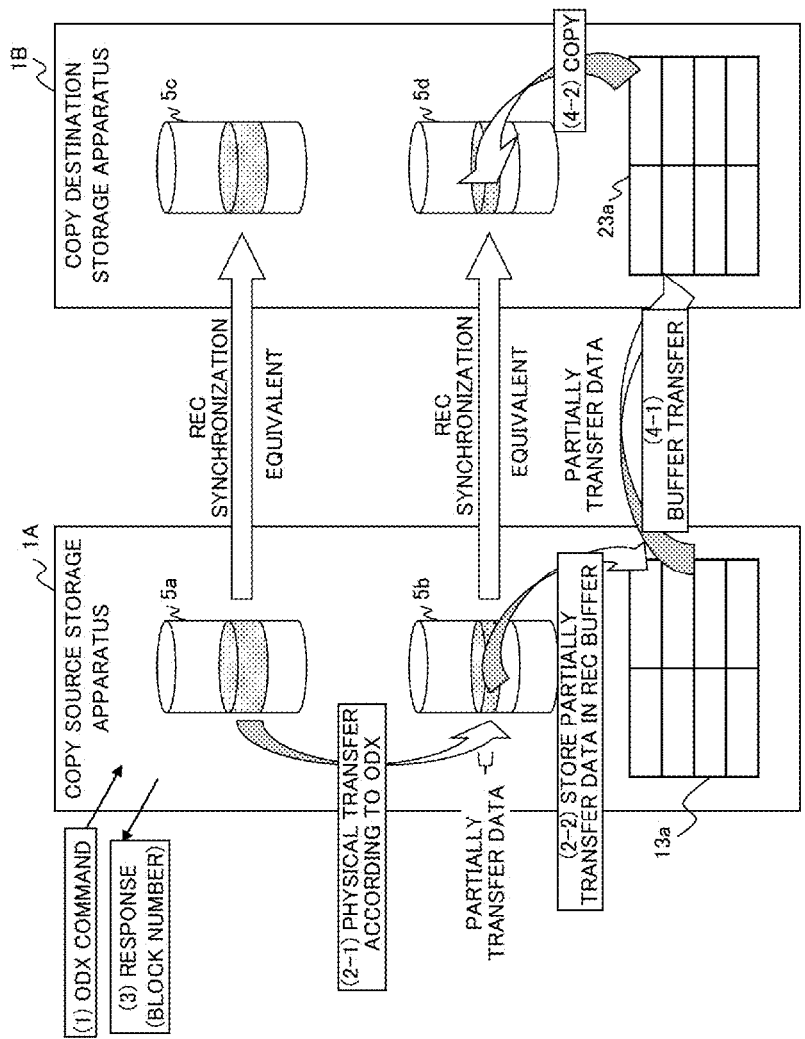
FIG. 8 is a diagram that illustrates a synchronous transfer process in the case of a consistency mode.
Figure 9:
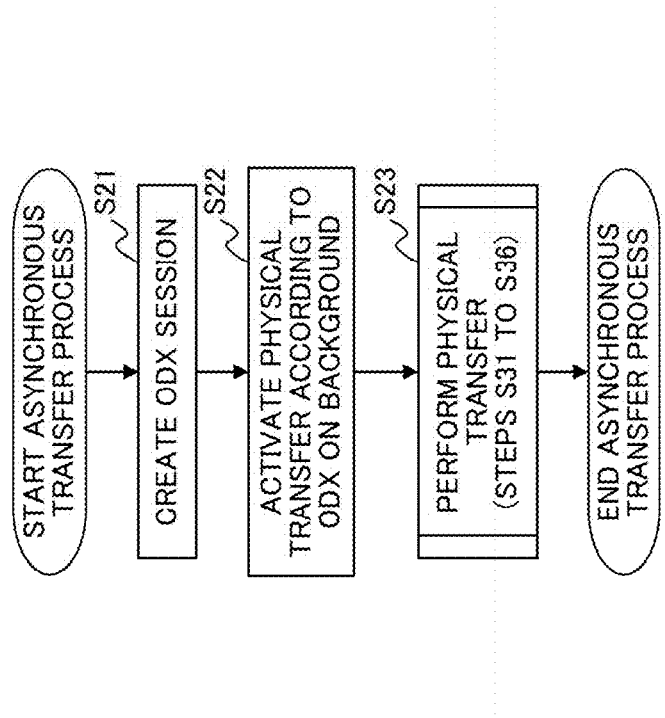
FIG. 9 is a flowchart that illustrates an example of an asynchronous transfer process illustrated in FIG. 5.
Figure 10:
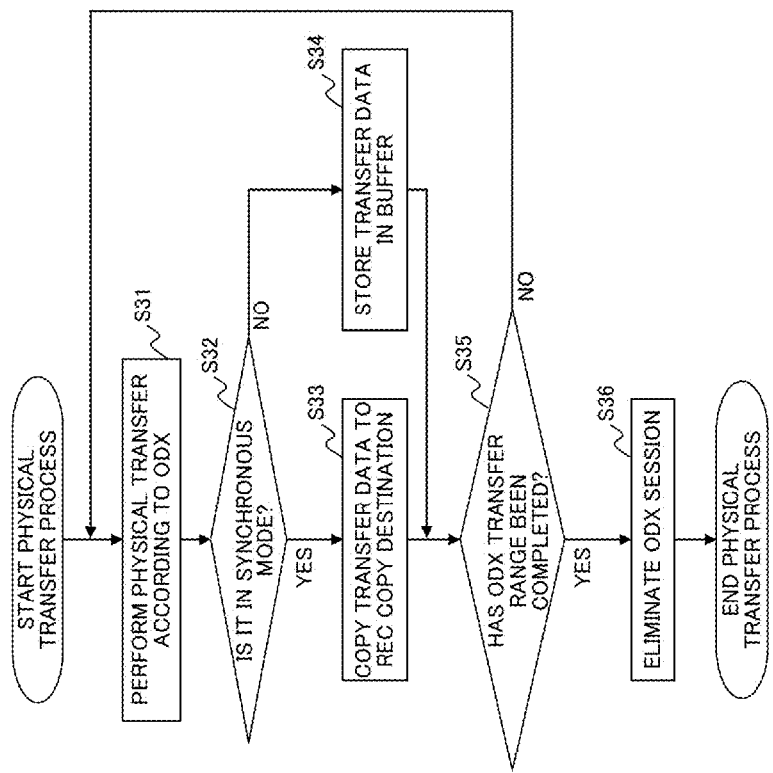
FIG. 10 is a flowchart that illustrates an example of a physical transfer process illustrated in FIG. 9.
Figure 11:
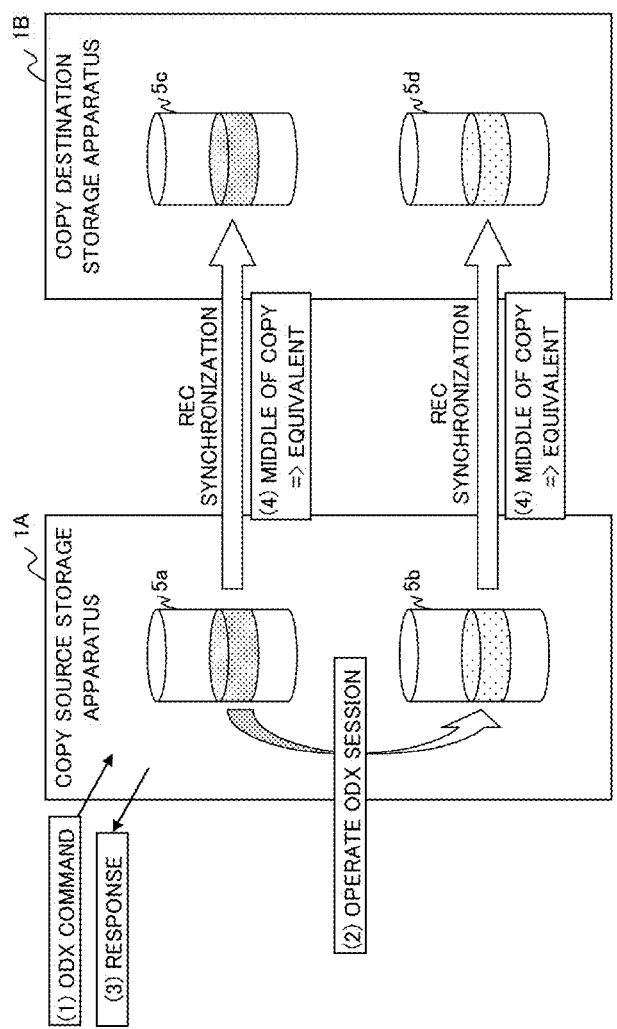
FIG. 11 is a diagram that illustrates an asynchronous transfer process in the case of the synchronous mode.
Figure 12:
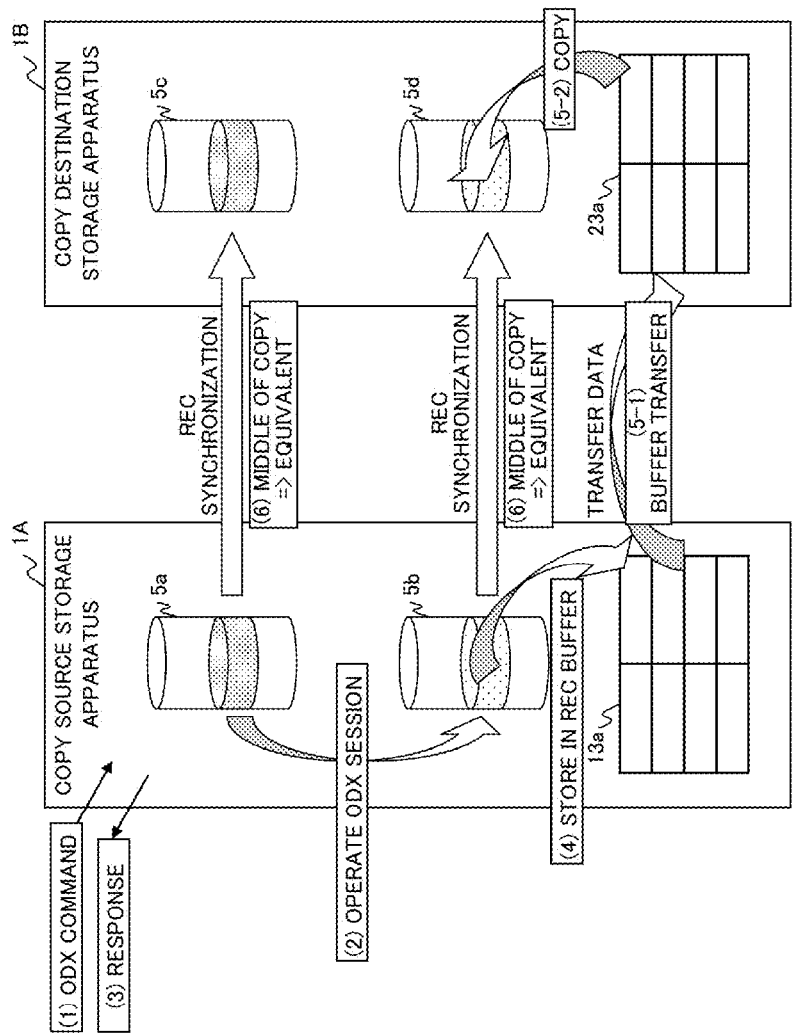
FIG. 12 is a diagram that illustrates an asynchronous transfer mode in the case of the consistency mode.

FIG. 5 is a flowchart that illustrates an example of the process in a case where the copy source storage apparatus 1A illustrated in FIG. 4 receives an ODX command, and FIG. 6 is a flowchart that illustrates an example of a synchronous transfer process illustrated in FIG. 5. FIG. 7 is a diagram that illustrates a synchronous transfer process in the case of the synchronous mode, and FIG. 8 is a diagram that illustrates a synchronous transfer process in the case of the consistency mode. FIG. 9 is a flowchart that illustrates an example of the asynchronous transfer process illustrated in FIG. 5, and FIG. 10 is a flowchart that illustrates an example of a physical transfer process illustrated in FIG. 9. FIG. 11 is a diagram that illustrates an asynchronous transfer process in the case of the synchronous mode, and FIG. 12 is a diagram that illustrates an asynchronous transfer process in the case of the consistency mode.

As illustrated in FIG. 5, when an ODX command is issued to the copy source storage apparatus 1A by the host apparatus 2, the ODX command is received by the ODX command controller 11b in Step S1 (see arrow (1) represented in FIGS. 7, 8, 11, and 12).

The ODX command controller 11b instructs the session management unit 12 to start an ODX session. The session management unit 12 determines whether or not the volume 5b of the transfer destination according to the ODX is the copy source of the REC in Step S2 and determines whether or not the REC is in the equivalent state in a case where the volume 5b is the copy source in Step S3.

In a case where the transfer destination is the copy source (Yes route of Step S2) and the REC is in the equivalent state (Yes route of Step S3), the ODX session management unit 12a performs a synchronous transfer process in Step S4 (Steps S11 to S15 illustrated in FIG. 6). When the synchronous transfer process is completed, the process proceeds to Step S6 to be described later.

On the other hand, in a case where the transfer destination is not the copy source (No route of Step S2) or the REC is not in the equivalent state (No route of Step S3), the ODX session management unit 12a starts an asynchronous transfer process in Step S5 (Steps S21 to S23 represented in FIG. 9). In addition, in Step S5, when an ODX session is started on the background in accordance with the start of the asynchronous transfer process, the ODX session management unit 12a returns a response to the ODX command to the host apparatus 2 through the ODX command controller 11b in Step S6.

As above, the process performed in a case where the copy source storage apparatus 1A receives an ODX command is completed.

Next, the synchronous transfer process performed in Step S4 will be described.

As illustrated in FIG. 6, in the synchronous transfer process, physical transfer according to the ODX is performed for at least some blocks (a part of the transfer data) of the transfer data by the ODX session management unit 12a in Step S11 (see arrow (2-1) represented in FIGS. 7 and 8). In addition, at the same time, the session management unit 12 determines whether or not the copy mode is the synchronous mode in Step S12.

In a case where the copy mode is the synchronous mode (Yes route of Step S12), the copy session management unit 12b copies the part of the transfer data read from the transfer source or written into the transfer destination to the copy destination of the REC in Step S13 (see arrow (2-2) represented in FIG. 7).

On the other hand, in a case where the copy mode is not the synchronous mode (No route of Step S12), in other words, in the case of the consistency mode, the part of the transfer data read from the transfer source or written into the transfer destination is transferred to the REC buffer management unit 13 by the copy session management unit 12b. The REC buffer management unit 13 stores the transferred part of the transfer data in the REC buffer 13a in Step S14 (see arrow (2-2) represented in FIG. 8).

When the process of Step S13 or S14 is completed, the ODX session management unit 12a determines whether the transfer process has been completed for the transfer range instructed in the ODX command or time-out occurs in Step S15. In a case where the transfer process has not been completed, and time-out does not occur (No route of Step S15), the process proceeds to Step S11.

On the other hand, in a case where the transfer process has been completed or time-out occurs (Yes route of Step S15), the synchronous transfer process is completed, and the process of Step S6 represented in FIG. 5 is performed. In other words, in Step S6 represented in FIG. 5, the ODX command controller 11b transmits a response to the ODX command to the host apparatus 2 (see arrow (3) represented in FIGS. 7 and 8). At this time, in the response, information relating to the number of blocks (transferable data) transferred until the completion of the transfer process or the time-out is included.

As above, in the case of the synchronous mode, the synchronous transfer process of a case where the copy source storage apparatus 1A receives an ODX command is completed.

In addition, in the case of the consistency mode, buffer transfer of the data (the part of the transfer data or the transferable data) stored in the REC buffer 13a is performed at predetermined timing by the REC buffer management unit 13 (see arrow (4-1) represented in FIG. 8). In addition, in the copy destination storage apparatus 1B, the data that is buffer-transferred and is stored in the REC buffer 23a is read by the session management unit 22 through the REC buffer management unit 23. Then, the session management unit 22 copies the data stored in the REC buffer 23a using the function of the REC into the copy destination volume 5d (see arrow (4-2) represented in FIG. 8).

As above, in the consistency mode, the synchronous transfer process in a case where the copy source storage apparatus 1A receives an ODX command is completed.

Based on the number of blocks included in the response, the host apparatus 2 issues a new ODX command to the copy source storage apparatus 1A for a transfer area for which transfer has not been performed in accordance with the previous ODX command. In other words, when the number of blocks that have been transferred is received, the host apparatus 2 issues an ODX command designating the next transfer range starting from the following block address. In the storage system 10, in this way, the above-described process is repeated until all the transfer data in the transfer range designated in the first ODX command is transferred (or is stored in the REC buffer 13a).

Next, the asynchronous transfer process started in Step S5 represented in FIG. 5 will be described.

As illustrated in FIG. 9, in the asynchronous transfer process, the ODX session management unit 12a generates an ODX session in Step S21 (see arrow (2) represented in FIGS. 11 and 12). Then, the ODX session management unit 12a starts physical transfer according to the ODX on the background in Step S22. In addition, the response to the ODX command in Step S6 represented in FIG. 5 is transmitted by the ODX command controller 11b to the host apparatus 2 when the process of Step S22 is completed (see arrow (3) represented in FIGS. 11 and 12).

Thereafter, the physical transfer process performed by the ODX session management unit 12a is performed in Step S23 (Steps S31 to S36 represented in FIG. 10).

As illustrated in FIG. 10, in the physical transfer process, the physical transfer according to the ODX is performed by the ODX session management unit 12a in Step S31. At this time, the session management unit 12 determines whether or not the copy mode is the synchronous mode in Step S32.

In a case where the copy mode is the synchronous mode (Yes route of Step S32), the copy session management unit 12b copies the transfer data read from the transfer source or written into the transfer destination to the copy destination of the REC in Step S33.

On the other hand, in a case where the copy mode is not the synchronous mode (No route of Step S32), in other words, in the case of the consistency mode, the transfer data read from the transfer source or written into the transfer destination by the copy session management unit 12b is transferred to the REC buffer management unit 13. The REC buffer management unit 13 stores the transferred transfer data in the REC buffer 13a in Step S34 (see arrow (4) represented in FIG. 12).

When the process of Step S33 or S34 is completed, the ODX session management unit 12a determines whether or not the transfer process has been completed for the transfer range instructed in the ODX command in Step S35. In a case where the transfer process has not been completed (No route of Step S35), the process proceeds to Step S31.

On the other hand, in a case where the transfer process has been completed (Yes route of Step S35), the ODX session management unit 12a removes the ODX session in Step S36.

In addition, in the case of the consistency mode, the data (transfer data) stored in the REC buffer 13a is transferred at predetermined timing by the REC buffer management unit 13 (see arrow (5-1) represented in FIG. 12). In addition, in the copy destination storage apparatus 1B, the data that is buffer-transferred and is stored in the REC buffer 23a is copied by the session management unit 22 to the volume 5d using the function of the REC (see arrow (5-2) represented in FIG. 12).

In any one copy mode of the synchronous mode and the consistency mode, the copy session management unit 12b causes the REC to transit to the equivalent state when copy of both the ODX session and the REC session is completed (see arrow (4) represented in FIG. 11 and arrow (6) represented in FIG. 12).

As above, the asynchronous transfer process in a case where the copy source storage apparatus 1A receives an ODX command is completed.

[2] Second Embodiment

Next, a storage system 10 according to a second embodiment will be described.

An example of the configuration of the storage system 10 according to the second embodiment, the appearance of backup, and an example of hardware configuration of the storage apparatus 1 are basically the same as those illustrated in FIGS. 1 to 3, and thus, duplicate description thereof will not be presented.

[2-1] Storage System

Here, the storage system 10 according to the second embodiment will be simply described.

As an operating form of the storage system 10, there are many cases where both the transfer source and the transfer destination of the ODX are copy targets (copy sources) according to the REC. Since the ODX is used by a work volume capable of recognizing the host apparatus 2, it is difficult to consider that only one of the transfer source and the transfer destination of the ODX is the REC target. Thus, such a requisite can be regarded to be satisfied in the operating environment of a general storage system 10.

In the above-described requisite, data of the transfer source (volume 5a) of the ODX is present in the copy destination storage apparatus 1B (volume 5c) of the REC. Accordingly, in the storage apparatus 1A, the copy of the transfer data transferred to the transfer destination (volume 5b) of the ODX to the storage apparatus 1B according to the REC can be omitted.

For example, in a case where the REC is in the equivalent state, when an ODX command is received from the host apparatus 2, the storage system 10 according to the second embodiment starts an ODX session, starts an ODX session also in the copy destination storage apparatus 1B, and then, returns a response to the host apparatus 2. In other words, the CM 3A of the copy source starts an ODX session also in the copy destination of the REC in synchronization with the start of the ODX session, and thereby operating the same ODX session in both the copy source and the copy destination according to the REC, whereby the equivalency between the copy source and the copy destination is protected.

Accordingly, similar to the first embodiment, also in a case where the storage apparatus 1A or the copy source storage area 5A is broken down after the reception of the ODX command, the host apparatus 2 can restore the storage apparatus 1A or the copy source storage area 5A from data stored in the copy destination storage area 5B.

In addition, since communication of the transfer data between the storage apparatuses 1 according to the REC can be omitted, the amount of data transfer between the storage apparatuses 1 can be reduced.

Furthermore, since the ODX session is operated on the background in the copy source and the copy destination, the copy source storage apparatus 1A can return the response to the host apparatus 2 after the start of the ODX session. Accordingly, a delay in the response can be shortened than that of a case where the physical transfer according to the ODX and the physical copy according to the REC are performed to be synchronized with each other.

The storage system 10 according to the second embodiment, as described above, is premised on that both the transfer source and the transfer destination (volumes 5a and 5b) of the ODX session in the copy source storage area 5A of the storage apparatus 1A are copy sources of the REC session. In such a case, volumes 5c and 5d included in the copy destination storage area 5B of the storage apparatus 1B are copy destinations of the REC session. In addition, the volumes 5c and 5d are the transfer source and the transfer destination of the copy destination ODX session that is started in the copy destination.

Hereinafter, the storage system 10 according to the second embodiment will be described in detail.

[2-2] Configuration of Storage System

Figure 13:
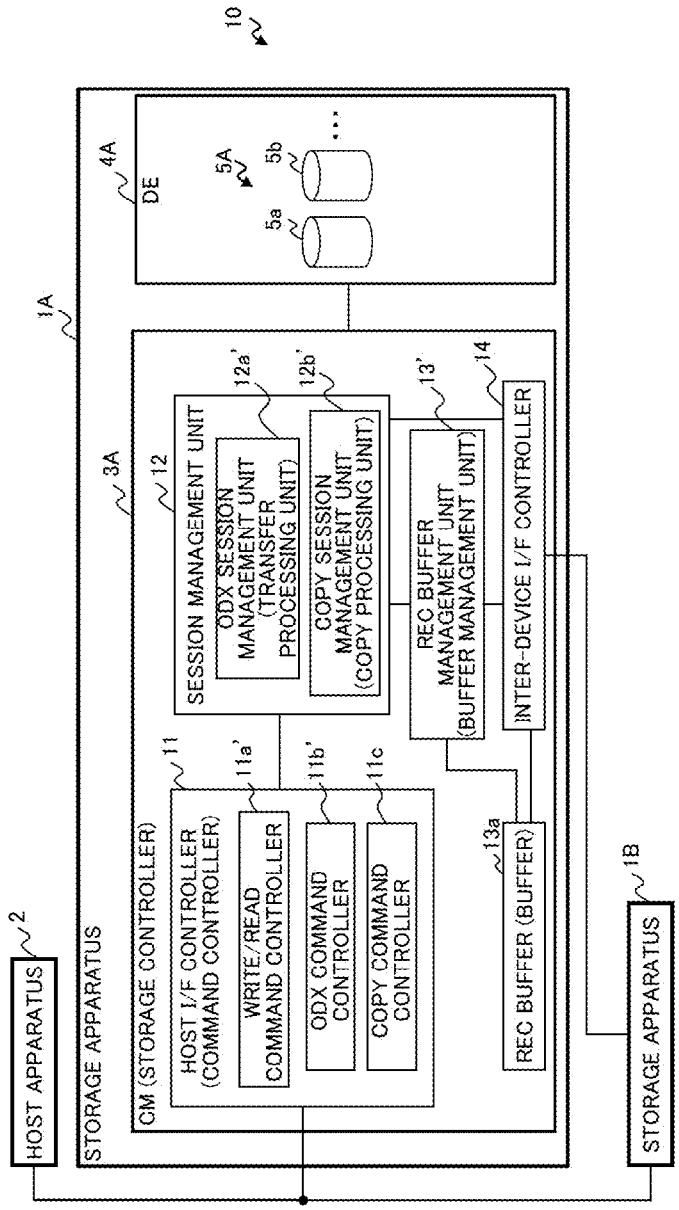
FIG. 13 is a diagram that illustrates an example of the functional configuration of a copy source storage apparatus as an example of a second embodiment.
Figure 14:
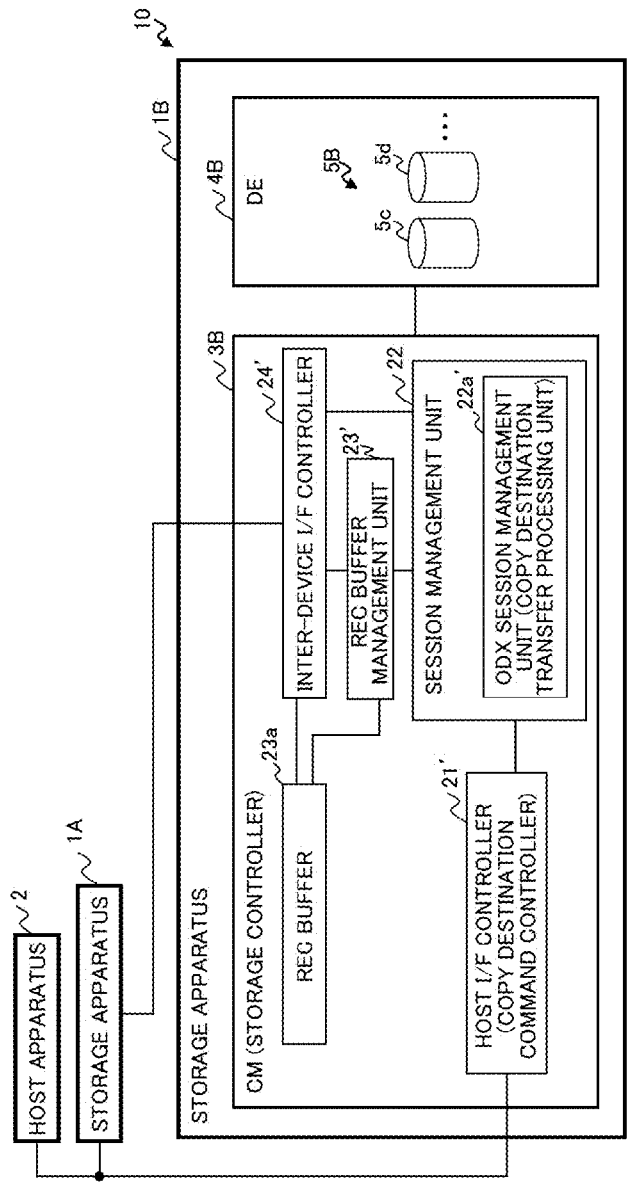
FIG. 14 is a diagram that illustrates an example of the configuration of a copy destination storage apparatus as an example of the second embodiment.

Next, the functional configuration of the storage system 10 illustrated in FIG. 1 will be described with reference to FIGS. 13 and 14. FIGS. 13 and 14 are diagrams that illustrate examples of the functional configuration of a copy source storage apparatus 1A and a copy destination storage apparatus 1B as examples of the second embodiment.

As illustrated in FIG. 13, the CM 3 has a configuration illustrated in the storage apparatus 1A for the function of the storage apparatus 1 of the copy source of the REC session and, as illustrated in FIG. 14, has a configuration as illustrated in the storage apparatus 1B for the function of the storage apparatus 1 of the copy destination of the REC session.

In the following description, the function of the storage system 10 relating to the ODX and the REC will be focused, and a case where the storage system 10 uses the synchronous mode out of copy modes of the REC and a case where the storage system 10 uses the consistency mode will be separately described.

In FIGS. 13 and 14, blocks to which the same reference signs as those illustrated in FIG. 4 are assigned have the same functions as those of the blocks illustrated in FIG. 4, and thus, duplicate description thereof will not be presented.

[2-2-1] Configuration of Copy Source Storage Apparatus

First, the configuration of the copy source storage apparatus 1A (CM 3A) will be described.

The CM 3A of the copy source storage apparatus 1A is equipped with: a host I/F controller 11; a session management unit 12; an REC buffer management unit 13'; an REC buffer 13a; and an inter-device I/F controller 14. Here, the REC buffer 13a and the inter-device I/F controller 14 are the same as those of the first embodiment.

The host I/F controller (command controller) 11 is equipped with: a write/read command controller 11a' and an ODX command controller 11b', which are different from those of the first embodiment; and a copy command controller 11c, which is the same as that of the first embodiment.

The write/read command controller 11a' performs control relating to the write/read commands received from the host apparatus 2.

For example, in a case where the REC is in the equivalent state, when a write command for the volume 5b is received, the write/read command controller 11a' instructs the DE 4 to write data into the write destination (writing area) of the volume 5b through the DI 35. In addition, the write/read command controller 11a' instructs the session management unit 12 to copy (start an ODX session in the copy destination CM 3B) the write data according to the REC into the copy destination (volume 5d).

In addition, in a case where the REC is in the equivalent state, the write/read command controller 11a' may receive a write command for the transfer destination (volume 5b) for which writing of the transfer data is incomplete according to the ODX on the background from the host apparatus 2.

In such a case, the write/read command controller 11a' causes the ODX session management unit 12a' to start physical transfer according to the ODX for the write destination before the writing of the write data and then writes the write data for the write destination (instructs the DE 4 to write the write data). Thereafter, the write/read command controller 11a' causes the copy session management unit 12b' to start copying the transfer data according to the ODX to the volume 5d. In addition, the write/read command controller 11a' causes the copy session management unit 12b' to transmit the write data to the copy destination using the function of the REC and write the write data into the volume 5b. Then, the write/read command controller 11a' returns a response to the host apparatus 2. Accordingly, for the write destination, the order between the transfer data of the ODX and the write data can be protected, and the synchronization (equivalent state) between the copy source storage area 5A and the copy destination storage area 5B can be reliably protected.

The ODX command controller 11b' performs control relating to the ODX command received from the host apparatus 2.

For example, when an ODX command used for giving an instruction for the transfer of data (transfer data) stored in the volume 5a to the volume 5b is received, the ODX command controller 11b' instructs the session management unit 12 to start an ODX session.

In addition, after the ODX session (transfer process) of the transfer data that is performed by the ODX session management unit 12a' and the issuance of a copy destination transfer command, which will be described later, performed by the copy session management unit 12b' are completed, the ODX command controller 11b' transmits a response to the ODX command to the host apparatus 2.

The REC buffer management unit (buffer management unit) 13' manages the REC buffer (buffer) 13a that is used by the CM 3A in the consistency mode of the REC.

For example, in a case where the REC is in the equivalent state, the REC buffer management unit 13' stores a copy destination transfer command in the REC buffer 13a in accordance with start of the copy that is made by the copy session management unit 12b'. In addition, the REC buffer management unit 13' transmits (buffer transfer) the copy destination transfer command stored in the REC buffer 13a to the storage apparatus 1B at predetermined timing that is the same as that of the REC buffer management unit 13 according to the first embodiment.

More specifically, when the copy destination transfer command for the copy destination (volume 5d) of the REC session is transferred from the copy session management unit 12b', the REC buffer management unit 13' stores the copy destination transfer commands in the REC buffer 13a in the order of the transfer.

In this way, the REC buffer management unit 13' transmits the copy destination transfer command to the copy destination (volume 5d) not in synchronization with writing of the transfer data to the transfer destination (volume 5b) according to the ODX session.

In addition, in a case where the REC is in the copy processing state, the REC buffer management unit 13' stores the transfer data written into the transfer destination (volume 5b) in accordance with the ODX session operating on the background in the REC buffer 13a. Furthermore, in a case where the REC is in the equivalent state or in the copy processing state, the REC buffer management unit 13' stores update data updated in the copy source storage area 5A in the REC buffer 13a.

Figure 15:
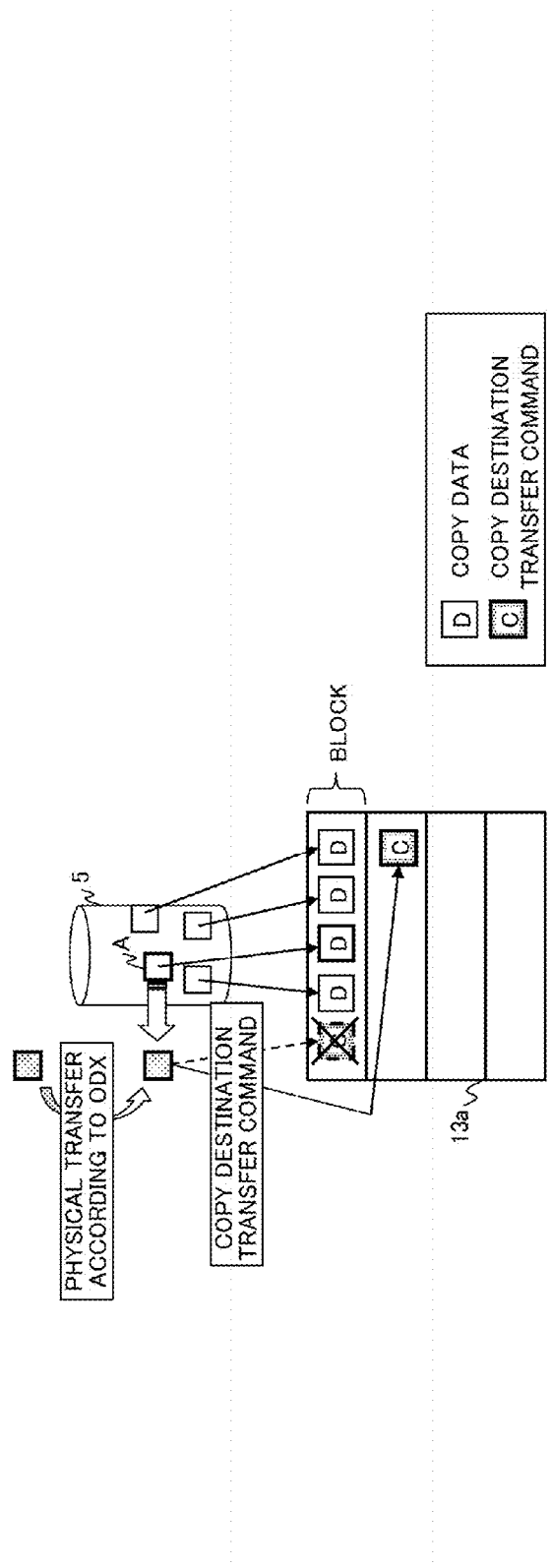
FIG. 15 is a diagram that illustrates an example of the process of an REC buffer management unit illustrated in FIG. 13.

FIG. 15 is a diagram that illustrates an example of the process of the REC buffer management unit 13' illustrated in FIG. 13. As illustrated in FIG. 15, the REC buffer management unit 13' stores update data or copy destination transfer commands in a block of a predetermined size that is included in the REC buffer 13a in order of the writing of update data or the issuance of the copy destination transfer commands.

When the block of the REC buffer 13a is full, the REC buffer management unit 13' switches to the next block and stores update data and copy destination transfer commands.

Here, the data stored inside the REC buffer 13a that is transmitted to the copy destination through the buffer transfer according to the REC is copied to the volume 5 of copy destination for each block. In this way, in the consistency mode, since data is copied into the volume 5 of the copy destination in units of blocks, the order of blocks is protected.

For example, as illustrated in FIG. 15, a case will be considered in which transfer data relating to the ODX is written into an area A in a state in which update data of the area A is stored in a block of the REC buffer 13a in the volume 5 of the transfer destination of the ODX. In this case, the REC buffer management unit 13' stores a copy destination transfer command relating to the area A in the block.

However, in the area A of the block, update data and the copy destination transfer commands are mixed. In this case, in the copy destination, since the order within the same block is not protected, there is a case where the transfer data is overwritten by update data.

Thus, when the copy destination transfer command is stored in the REC buffer 13a, the REC buffer management unit 13' refers to management information (not illustrated in the figure) used for managing the address of data stored in the block from the memory 32 or the like. Then, when it is determined that update data is stored in the same block based on the management information, the REC buffer management unit 13' switches the target block to the next block (performs buffer switching) even when the block is not full and stores the copy destination transfer command in the block to which the switching has been made.

In this way, even in a case where the copy destination transfer command is transmitted to the copy destination through the REC buffer 13a, the order within the block can be protected.

In addition, in a case where the REC is in the equivalent state, even though the write/read command controller 11a' receives a write command for the transfer destination (volume 5b) in which transfer according to the ODX is operated on the background, the REC buffer management unit 13' may perform the same process.

The session management unit 12 includes an ODX session management unit 12a' and a copy session management unit 12b', which are different from those of the first embodiment.

In a case where the REC is in the equivalent state, the ODX session management unit (transfer processing unit) 12a' starts (initiates) an ODX session in which transfer data is read from the volume 5a that is the transfer source and is written into the volume 5b that is the transfer destination in accordance with reception of the ODX command.

More specifically, the ODX session management unit 12a' starts an ODX session in accordance with reception of an ODX command and transmits the transfer data on the background.

In a case where the REC is in the equivalent state, the copy session management unit (copy processing unit) 12b' starts copying transfer data into the volume 5d (corresponding area) of the copy destination storage area 5B that corresponds to the transfer destination (the volume 5b of the copy source) of the ODX in the REC session (copy process) together with the start of the ODX session. In other words, the copy session management unit 12b' starts copying the transfer data in the REC session by being triggered upon the start (reception of an ODX command) of the ODX session.

More specifically, in a case where the REC is in the equivalent state, the copy session management unit 12b' issues a copy destination transfer command in the start process of the copy.

Here, the copy destination transfer command is control information (ODX control information) used for starting an ODX session. For example, in the copy destination transfer command, a volume number and a logical block address (LBA) of the copy range are included. The copy session management unit 12b', for example, may generate a copy destination transfer command by modifying an ODX command transmitted from the host apparatus 2 or may generate a command similar to the ODX command or an instruction used for communication between the storage apparatuses 1 as the copy destination transfer command.

In this way, the ODX command controller 11b' issues the copy destination transfer command used for giving an instruction for transferring copy destination transfer data corresponding to the transfer data to the copy destination (volume 5d) that corresponds to the transfer destination (volume 5b) of the ODX, which is stored in the copy destination (volume 5c) corresponding to the transfer source (volume 5a) of the ODX, to the copy destination.

Here, the copy started by the copy session management unit 12b' is performed as below depending on the copy mode of the REC which is the synchronous mode or the consistency mode.

Case of Synchronous Mode

In the case of the synchronous mode, the copy session management unit 12b' transmits the issued copy destination transfer command to the other storage apparatus 1B in the started copy using the function of the REC.

In addition, in the case of the synchronous mode, after the start process (initiation process) of the ODX session that is performed by the ODX session management unit 12a' and the transmission of the copy destination transfer command that is performed by the copy session management unit 12b' are completed, the ODX command controller 11b' transmits a response to the host apparatus 2.

Case of Consistency Mode

In the case of the consistency mode, the copy session management unit 12b' transfers the generated copy destination transfer command to the REC buffer management unit 13' in the started copy and instructs the REC buffer management unit 13' to store the copy destination transfer command in the REC buffer 13a. The copy destination transfer command stored in the REC buffer 13a, as described above, is transmitted by the REC buffer management unit 13' to the storage apparatus 1B at predetermined timing using the function of the REC.

In addition, in the case of the consistency mode, after the start process of the ODX session that is performed by the ODX session management unit 12a' and the storage of the copy destination transfer command into the REC buffer 13a that is performed by the REC buffer management unit 13' are completed, the ODX command controller 11b' transmits a response to the host apparatus 2.

As above, in the synchronous mode, after the start of the ODX session according to the ODX and the transmission of the copy destination transfer command according to the REC are completed, the ODX command controller 11b' returns a response to the host apparatus 2. Accordingly, in the response to the host apparatus 2, the synchronization (equivalent state) between the copy source storage area 5A and the copy destination storage area 5B can be reliably protected.

In addition, in the case of the consistency mode, after the start of the ODX session according to the ODX and the storage of the copy destination transfer command into the REC buffer 13a according to the REC are completed, the ODX command controller 11b' transmits a response to the host apparatus 2. Accordingly, in the response to the host apparatus 2, the synchronization between the copy source storage area 5A and the copy destination storage area 5B can be protected at a level allowed in the consistency mode that is an asynchronous copy mode.

[2-2-2] Configuration of Copy Destination Storage Apparatus

Next, the configuration of the copy destination storage apparatus 1B (CM 3B) will be described.

As illustrated in FIG. 14, the CM 3B of the copy destination storage apparatus 1B is equipped with: a host I/F controller 21'; a session management unit 22; an REC buffer management unit 23'; an REC buffer 23a; and an inter-device I/F controller 24'. Here, the REC buffer 23a is the same as that of the first embodiment.

The host I/F controller (copy destination command controller) 21' basically has the same function as that of the host I/F controller 21 according to the first embodiment. For example, when a suspend command of the REC is received from the host apparatus 2, the host I/F controller 21' instructs the session management unit 22 to stop the REC session.

In addition, there is a case where the host I/F controller 21' receives a read command for the transfer destination (volume 5d) of the copy destination for which physical transfer of the ODX based on the copy destination transfer command is incomplete from the host apparatus 2.

In such a case, the host I/F controller 21' causes the session management unit 22 to start physical transfer according to the ODX to the reading source (reading area). More specifically, the host I/F controller 21' causes the ODX session management unit 22a' to write the copy destination transfer data to the reading source of the volume 5d.

Then, after the physical transfer to the reading source is completed, the host I/F controller 21' responses to the host apparatus 2 with read data relating to the read command. More specifically, the host I/F controller 21' responses to the host apparatus 2 with the copy destination transfer data read from the transfer source (volume 5c) or written into the transfer destination (the reading source; the volume 5d).

In this way, even when a read command for the transfer destination (volume 5d) to which the physical transfer according to the ODX is incomplete is issued, physical transfer according to the ODX for the reading source is started by the host I/F controller 21' by being triggered upon the read command. Then, the latest read data is read by the host I/F controller 21', and a response thereof to the host apparatus 2 is made. In this way, while the processing load is reduced by performing the copy destination ODX session on the background, the CM 3B can reliably protect the synchronization (equivalent state) between the copy source storage area 5A and the copy destination storage area 5B.

The REC buffer management unit 23' manages the REC buffer 23a used by the CM 3B in the consistency mode of the REC.

For example, in a case where the REC is in the equivalent state, the REC buffer management unit 23' stores data (copy destination transfer command) transmitted (buffer transfer) from the storage apparatus 1A in the REC buffer 23a. In addition, the REC buffer management unit 23', at predetermined timing that is the same as that of the REC buffer management unit 13', reads the data stored in the REC buffer 23a in units of blocks in the order of storage and transfers the read data to the session management unit 22.

The session management unit 22 is basically the same as the session management unit 22 according to the first embodiment. The session management unit 22 manages sessions such as the ODX session and the REC session.

For example, in a case where the REC is in the copy processing state or the equivalent state, the session management unit 22 instructs the DE 4 to write the data of the copy source storage area 5A relating to the REC session that is transmitted from the storage apparatus 1B into the corresponding copy destination storage area 5B.

The session management unit 22 includes an ODX session management unit 22a'.

In a case where the REC is in the equivalent state, the ODX session management unit (copy destination transfer processing unit) 22a' starts a copy destination ODX session (copy destination transfer process) based on the copy destination transfer command received from the storage apparatus 1A. More specifically, the ODX session management unit 22a' starts (initiates) a copy destination ODX session in which copy destination transfer data is read from a transfer source (volume 5c) designated in the command and is written into a transfer destination (volume 5d) on the background.

In addition, in the case of the synchronous mode, the ODX session management unit 22a' receives a copy destination transfer command from the inter-device I/F controller 24'. Furthermore, in the case of the consistency mode, the ODX session management unit 22a' receives the copy destination transfer command stored in the REC buffer 23a from the REC buffer management unit 23'.

The inter-device I/F controller 24' is basically the same as the inter-device I/F controller 24 according to the first embodiment.

In addition, in a case where the REC is in the equivalent state, there are cases where the inter-device I/F controller 24' receives write data for the transfer destination (volume 5d) of the ODX operating on the background from the storage apparatus 1A.

In such cases, the inter-device I/F controller 24', similar to the above-described write/read command controller 11a', before writing the write data, causes the ODX session management unit 22a' to start physical transfer according to the ODX for the write destination (writing area). Then, the inter-device I/F controller 24' instructs the DE 4 to write the write data into the write destination. In this way, for the write destination, the order between the transfer data and the write data of the ODX can be protected, whereby the storage apparatuses 1A and 1B can be maintained in a correct equivalent state.

[2-3] Example of Operation of Storage System

Next, an example of the operation of the storage system 10 as an example of the second embodiment configured as described above will be described with reference to FIGS. 16 to 26.

[2-3-1] Example of Operation in Case where Copy Source Storage Apparatus Receives ODX Command First, an example of the operation of a case where the copy source storage apparatus 1A illustrated in FIG. 13 receives an ODX command will be described with reference to FIGS. 16 to 20.

Figure 16:
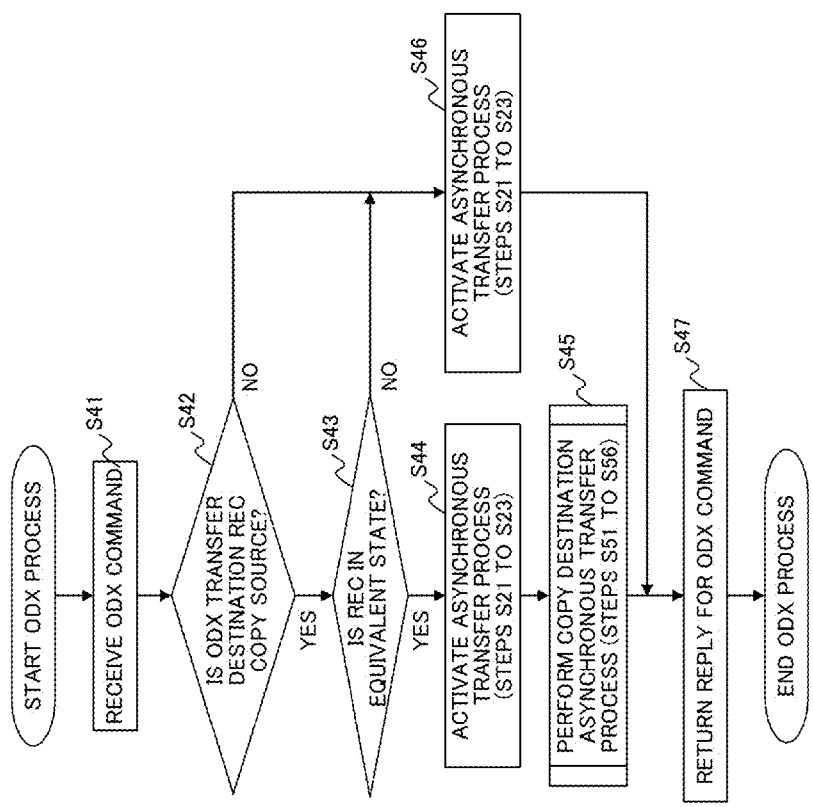
FIG. 16 is a flowchart that illustrates an example of the process in a case where the copy source storage apparatus illustrated in FIG. 13 receives an ODX command.
Figure 17:
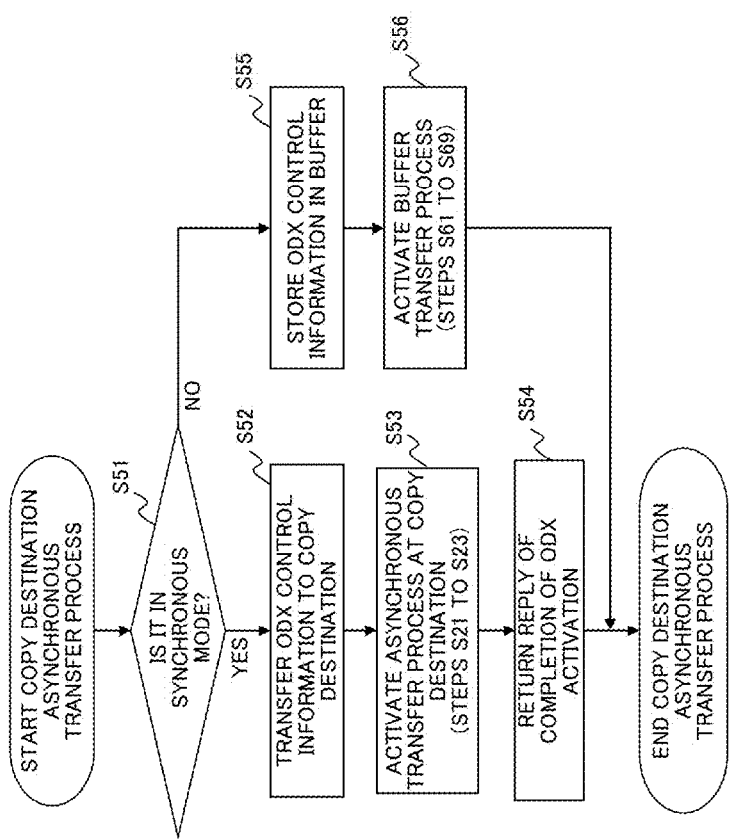
FIG. 17 is a flowchart that illustrates an example of a copy destination asynchronous transfer process illustrated in FIG. 16.
Figure 18:
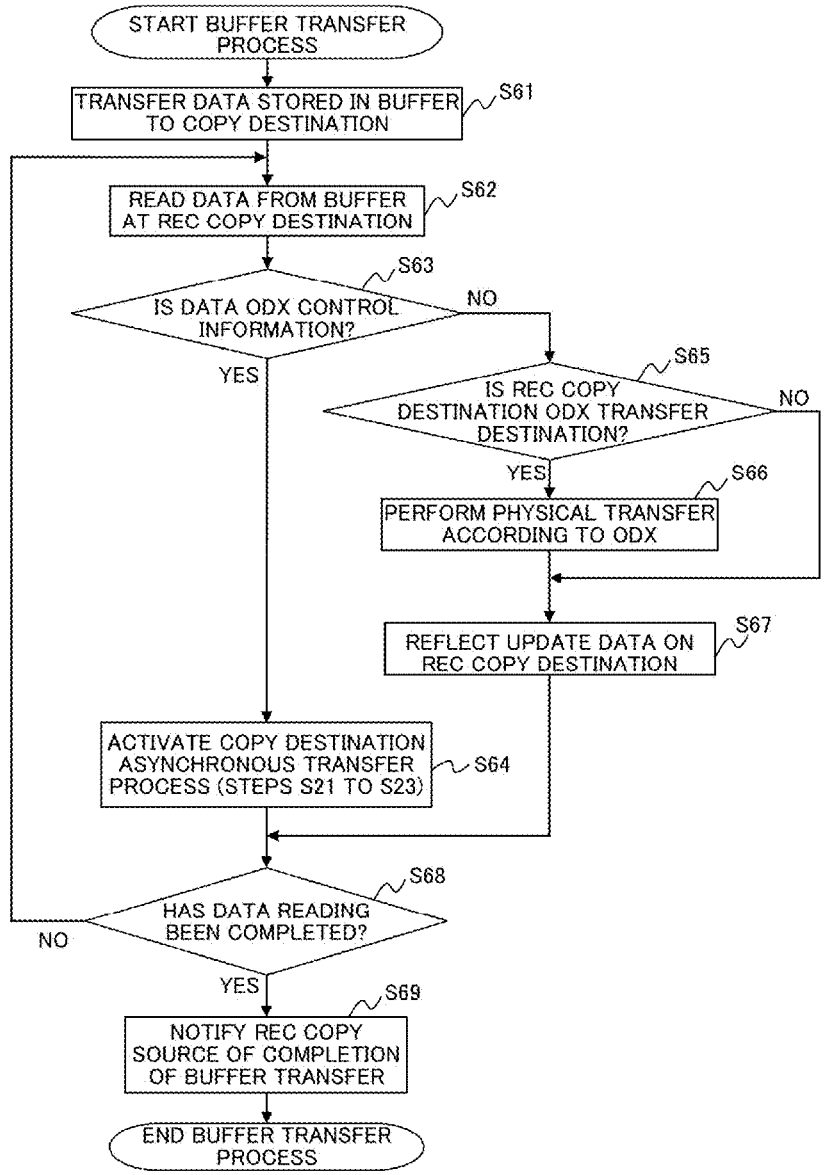
FIG. 18 is a flowchart that illustrates an example of a buffer transfer process illustrated in FIG. 17.
Figure 19:
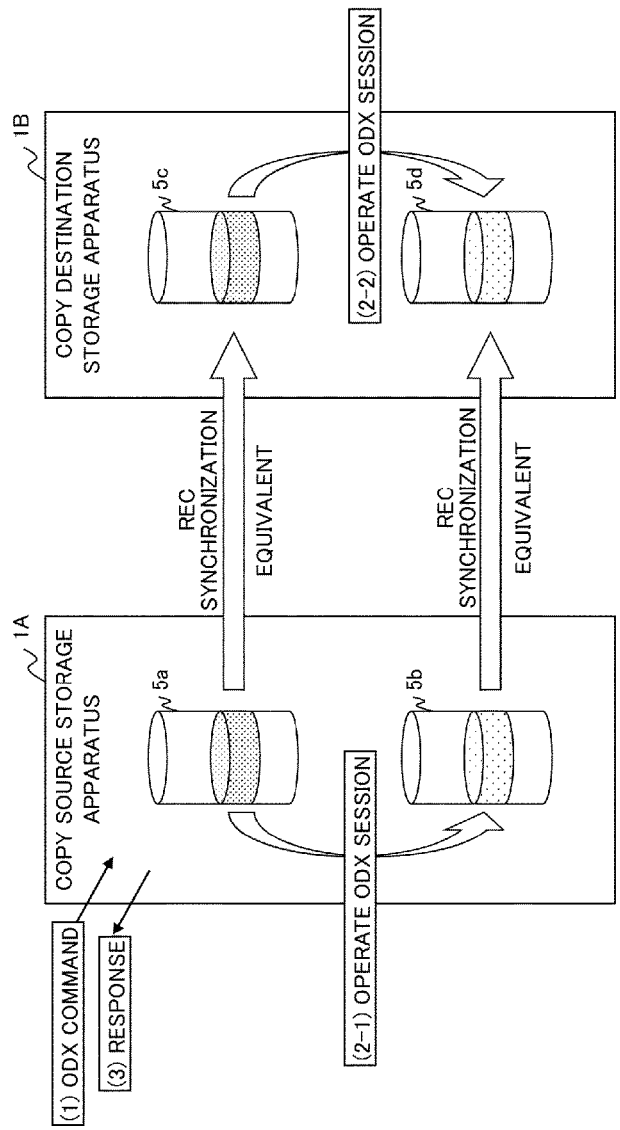
FIG. 19 is a diagram that illustrates an asynchronous transfer process in the case of the synchronous mode.

FIG. 16 is a flowchart that illustrates an example of the process in a case where the copy source storage apparatus 1A illustrated in FIG. 13 receives an ODX command, and FIG. 17 is a flowchart that illustrates an example of a copy destination asynchronous transfer process illustrated in FIG. 16. FIG. 18 is a flowchart that illustrates an example of a buffer transfer process illustrated in FIG. 17. FIG. 19 is a diagram that illustrates an asynchronous transfer process in the case of the synchronous mode, and FIG. 20 is a diagram that illustrates an asynchronous transfer process in the case of the consistency mode.

The asynchronous transfer process illustrated in FIGS. 16 to 18 is the same as or approximately the same as the process described with reference to FIGS. 9 and 10, and thus, duplicate description will not be presented in the following description.

Figure 20:
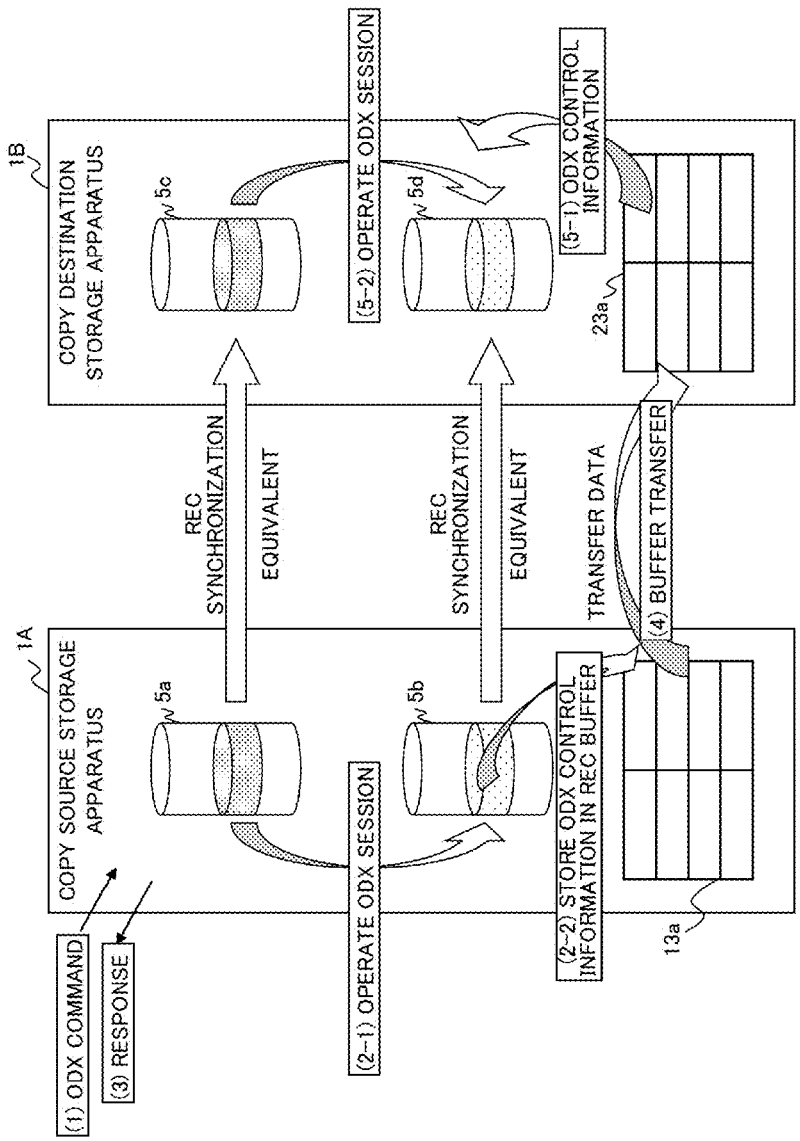
FIG. 20 is a diagram that illustrates an asynchronous transfer process in the case of the consistency mode.

As illustrated in FIG. 16, when an ODX command is issued to the copy source storage apparatus 1A of the REC by the host apparatus 2, the ODX command is received by the ODX command controller 11b' in Step S41 (see arrow (1) represented in FIGS. 19 and 20).

The ODX command controller 11b' instructs the session management unit 12 to start transfer process. The session management unit 12 determines whether or not the volume 5b of the transfer destination according to the ODX is the copy source of the REC in Step S42 and determines whether or not the REC is in the equivalent state in a case where the volume 5b is the copy source in Step S43.

In a case where the transfer destination is the copy source (Yes route of Step S42) and the REC is in the equivalent state (Yes route of Step S43), the ODX session management unit 12a' starts an asynchronous transfer process in Step S44 (Steps S21 to S23 illustrated in FIG. 9). In addition, in Step S44, when an ODX session is started on the background in accordance with the start of the asynchronous transfer process (see arrow (2-1) represented in FIGS. 19 and 20), the ODX session management unit 12a' performs the next process of Step S45.

In Step S45, the copy session management unit 12b' starts an asynchronous transfer process of the copy destination storage apparatus 1B (Steps S51 to S56 represented in FIG. 17). When the copy destination synchronous transfer process of Step S45 is completed, a response to the ODX command is returned to the host apparatus 2 in Step S47 (see arrow (3) represented in FIGS. 19 and 20), and the process of the case where the copy source storage apparatus 1A receives the ODX command is completed.

On the other hand, in a case where the transfer destination is not the copy source (No route of Step S42) or the REC is not in the equivalent state (No route of Step S43), the ODX session management unit 12a' starts an asynchronous transfer process in Step S46. When the asynchronous transfer process of Step S46 is started, the process proceeds to Step S47.

Next, the copy destination asynchronous transfer process performed in Step S45 will be described.

As illustrated in FIG. 17, in the copy destination asynchronous transfer process, the session management unit 12 determines whether or not the copy mode is the synchronous mode in Step S51. In addition, before or after Step S51, the copy session management unit 12b' issues (generates) ODX control information (copy destination transfer command) used for giving an instruction for transferring copy destination transfer data from the copy destination volume 5c to the copy destination volume 5d.

In a case where the copy mode is the synchronous mode (Yes route of Step S51), the issued ODX control information is transmitted to the storage apparatus 1B through the inter-device I/F controller 14 by the copy session management unit 12b' in Step S52.

In the storage apparatus 1B that has received the ODX control information using the inter-device I/F controller 24', an asynchronous transfer process is started based on the ODX control information by the ODX session management unit 22a' in Step S53 (Steps S21 to S23 represented in FIG. 9). In addition, in Step S53, when an ODX session is started on the background in accordance with the start of the asynchronous transfer process (see arrow (2-2) represented in FIG. 19), the ODX session management unit 22a' returns a response of the completion of the start of the ODX to the copy source storage apparatus 1A in Step S54.

As above, in the case of the synchronous mode, the copy destination asynchronous transfer process of a case where the copy source storage apparatus 1A receives the ODX command is completed.

On the other hand, in a case where the copy mode is not the synchronous mode (No route of Step S51), in other words, in the case of the consistency mode, the issued ODX control information is transferred to the REC buffer management unit 13' by the copy session management unit 12b'. In the REC buffer management unit 13', the transferred ODX control information is stored in the REC buffer 13a in Step S55 (see arrow (2-2) represented in FIG. 20).

Then, the buffer transfer process is started by the REC buffer management unit 13' in Step S56 (Steps S61 to S69 represented in FIG. 18), and the copy destination asynchronous transfer process of a case where the copy source storage apparatus 1A receives the ODX command in the case of the consistency mode is completed.

Next, the buffer transfer process performed in Step S56 will be described.

The buffer transfer process illustrated in FIG. 18 is regularly started on the background by the REC buffer management unit 13'.

As illustrated in FIG. 18, the data (ODX control information) stored in the REC buffer 13a is read by the REC buffer management unit 13', and buffer transfer of the read data to the copy destination is performed in Step S61 (see arrow (4) represented in FIG. 20). In addition, in the copy destination storage apparatus 1B, the data stored in the REC buffer 23a through the buffer transfer is read by the session management unit 22 through the REC buffer management unit 23' in Step S62 (see arrow (5-1) represented in FIG. 20). Then, the session management unit 22 determines whether or not the read data is the ODX control information in Step S63.

In a case where the read data is the ODX control information (Yes route of Step S63), the ODX session management unit 22a' starts an asynchronous transfer process at the copy destination based on the ODX control information in Step S64. In addition, in Step S64, when the ODX session is started on the background in accordance with the start of the asynchronous transfer process (see arrow (5-2) represented in FIG. 20), the ODX session management unit 22a' performs the next process of Step S68.

On the other hand, in a case where the data read from the REC buffer 23a is not the ODX control information (No route of Step S63), in other words, in the case of update data, the session management unit 22 determines whether or not the volume 5 of the copy destination of the REC is the transfer destination according to the ODX in Step S65.

In a case where the volume 5 (for example, the volume 5d) is the transfer destination according to the ODX (Yes route of Step S65), the ODX session management unit 22a' performs physical transfer of the copy destination transfer data from the transfer source (volume 5c) according to the existing ODX to the volume 5d in Step S66. In a case where the transfer is completed or a case where the volume 5 is not the transfer destination according to the ODX (No route of Step S65), the inter-device I/F controller 24' reflects the update data read from the REC buffer 13a on the copy destination of the REC in Step S67, and the process proceeds to Step S68.

In Step S68, the REC buffer management unit 23' determines whether or not reading of the data from the REC buffer 23a has been completed. In a case where the reading of the data has not been completed (No route of Step S68), the process proceeds to Step S62. On the other hand, in a case where the reading of all the data stored in the REC buffer 23a has been completed (Yes route of Step S68), the REC buffer management unit 23' notifies the copy source of the REC of the completion of the buffer transfer through the inter-device I/F controller 24' in Step S69.

As above, the buffer transfer process performed by the REC buffer management unit 13' is completed.

[2-3-2] Example of Operation in Case where Copy Destination Storage Apparatus Receive Read Command Next, an example of the operation of a case where the copy destination storage apparatus 1B illustrated in FIG. 14 receives a read command will be described with reference to FIGS. 21 to 23.

Figure 21:
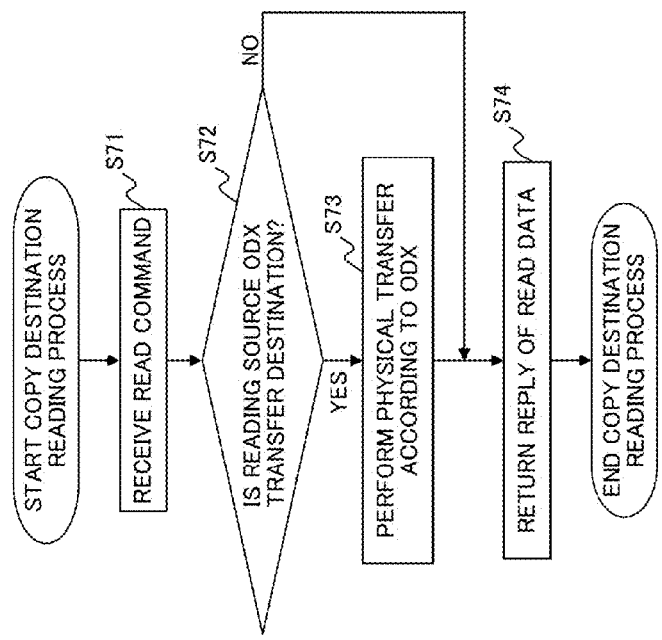
FIG. 21 is a flowchart that illustrates an example of the process in a case where the copy destination storage apparatus illustrated in FIG. 14 receives a read command.

FIG. 21 is a flowchart that illustrates an example of the process in a case where the copy destination storage apparatus 1B illustrated in FIG. 14 receives a read command. FIG. 22 is a diagram that illustrates a copy destination reading process in the case of the synchronous mode, and FIG. 23 is a diagram that illustrates a copy destination reading process in the case of the consistency mode.

Hereinafter, a case will be considered in which the copy source is broken down after an ODX session is started in the storage apparatuses 1 of the copy source and the copy destination illustrated in FIGS. 13 and 14. At this time, as illustrated in FIGS. 22 and 23, the host apparatus 2 issues a suspend command to the copy destination, and the host I/F controller 21' receives the suspend command (see arrow (1-1) represented in FIGS. 22 and 23). The session management unit 22 suspends the equivalent state with the copy source (see arrow (1-2) represented in FIGS. 22 and 23) and returns a response to the host apparatus 2 (see arrow (1-3) represented in FIGS. 22 and 23). In addition, in order to restore the copy source, the host apparatus 2 issues a read command to the copy destination.

Figure 22:
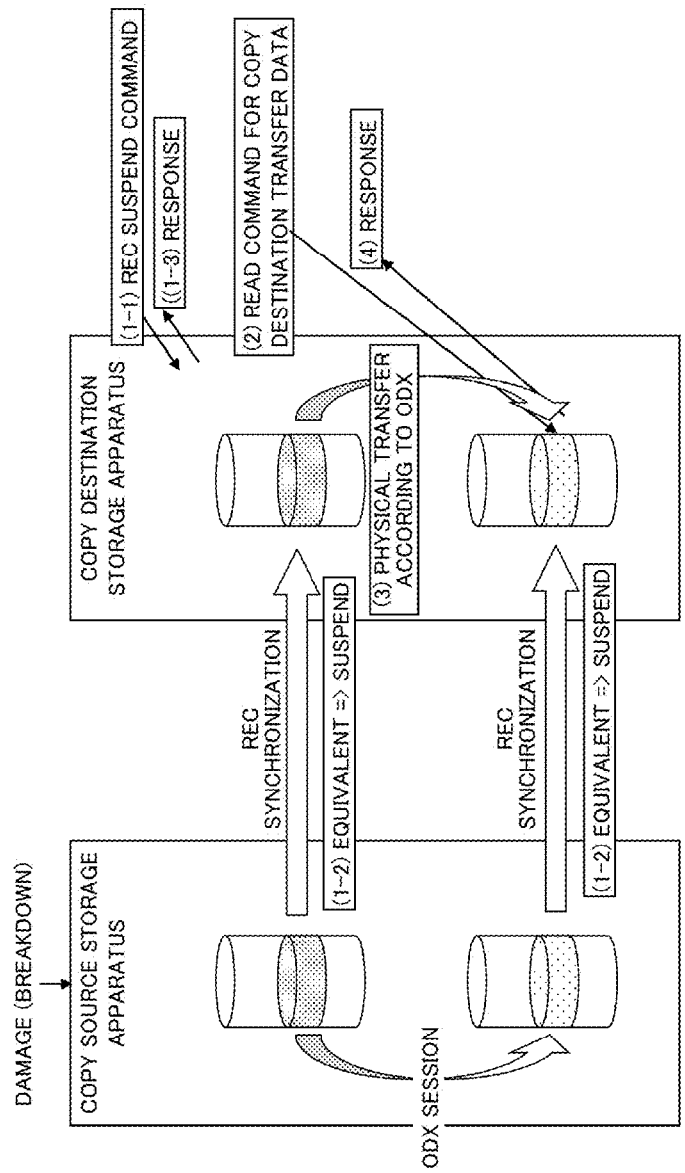
FIG. 22 is a diagram that illustrates a copy destination reading process in the case of the synchronous mode.
Figure 23:
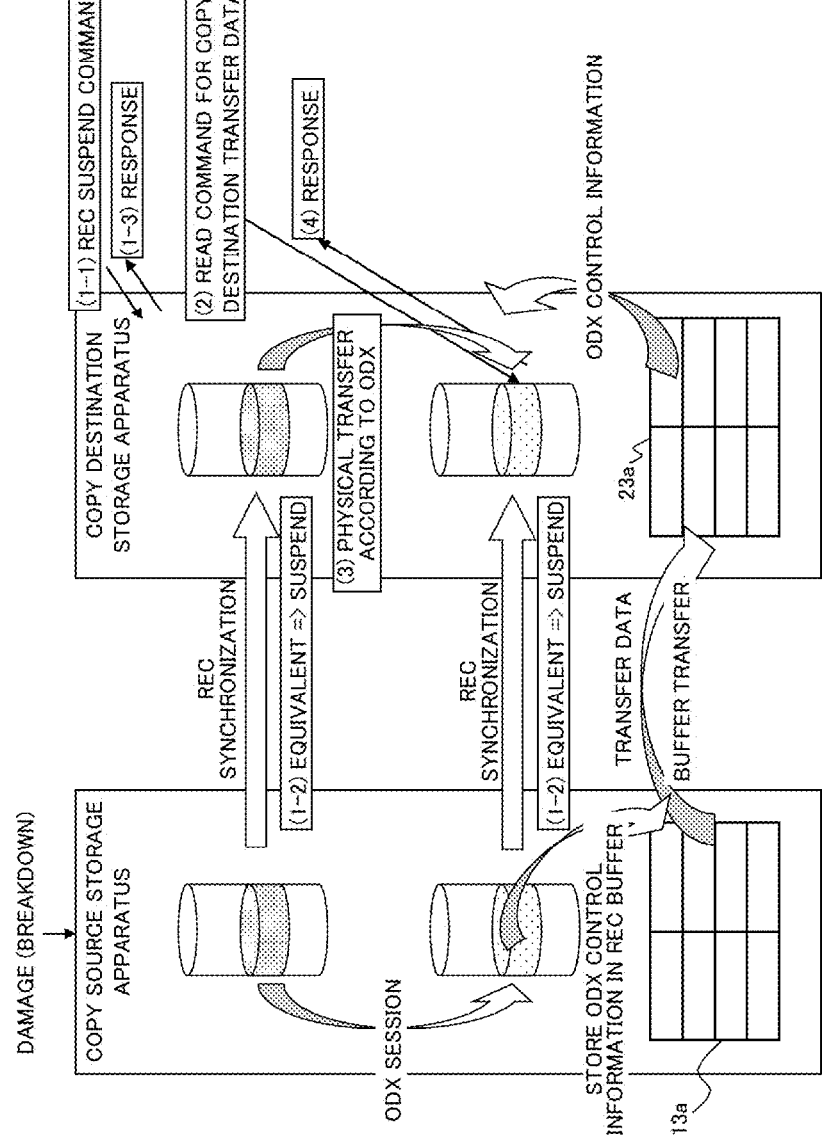
FIG. 23 is a diagram that illustrates a copy destination reading process in the case of the consistency mode.

On the premise described above, as illustrated in FIG. 21, when the host I/F controller 21' receives the read command in Step S71 (see arrow (2) represented in FIGS. 22 and 23), the session management unit 22 determines whether or not the reading source is the transfer destination of the ODX in Step S72.

In a case where the reading source is the transfer destination of the ODX (Yes route of Step S72), the ODX session management unit 22a' performs physical transfer of the copy destination transfer data from the transfer source (volume 5c) according to the existing ODX to the volume 5d in Step S73 (see arrow (3) represented in FIGS. 22 and 23). In a case where the transfer has been completed or a case where the reading source is not the transfer destination according to the ODX (No route of Step S72), the host I/F controller 21' transmits a response including the copy destination transfer data relating to the read command to the host apparatus 2 in Step S74. The copy destination transfer data included in the response is data read from the volume 5c in the transfer process of the ODX or data read from the volume 5d for which the transfer process has been performed.

As above, the process in the case where the copy destination storage apparatus 1B receives the read command is completed.

In Step S74, as the read data responding to the host apparatus 2, the host I/F controller 21' may use the data read from the transfer source by the ODX session management unit 22a' for writing the data into the transfer destination in Step S73.

[2-3-3] Example of Operation in Case where Copy Source Storage Apparatus Receives Write Command Next, an example of the operation of a case where the copy source storage apparatus 1A illustrated in FIG. 13 receives a write command will be described with reference to FIGS. 24 to 26.

Figure 24:
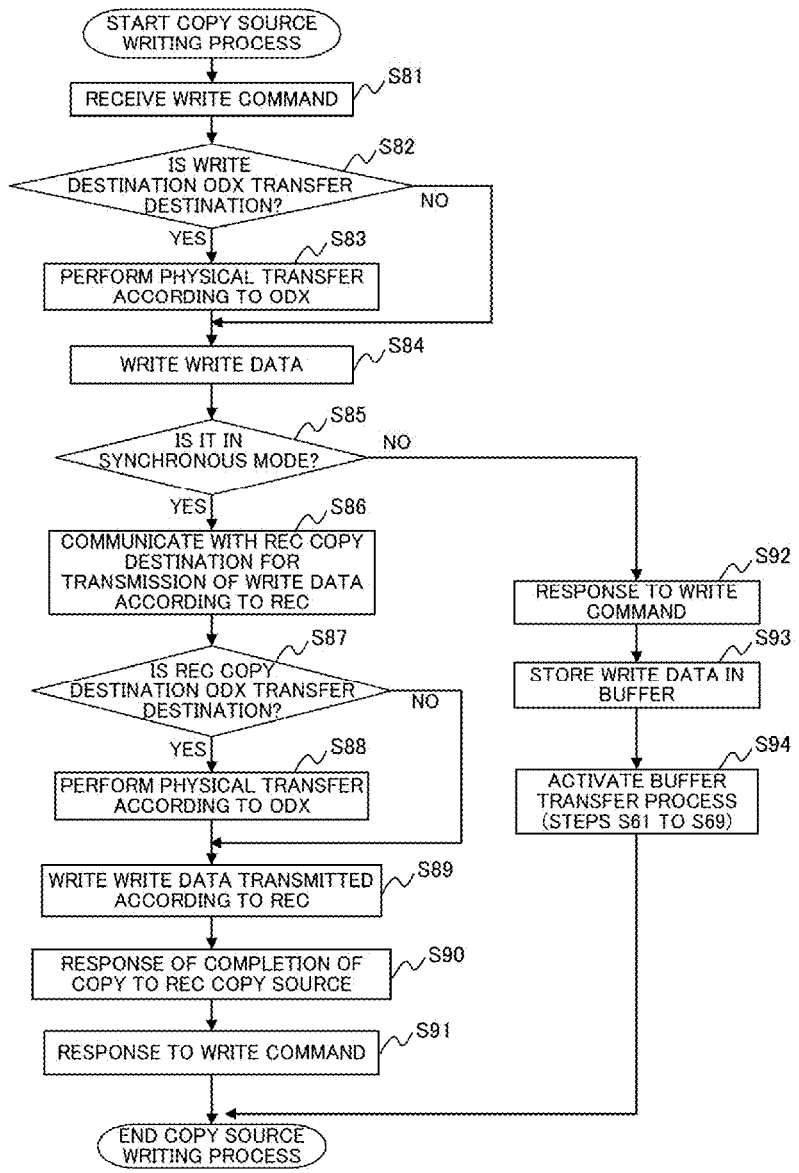
FIG. 24 is a flowchart that illustrates an example of the process in a case where the copy source storage apparatus illustrated in FIG. 13 receives a write command.

FIG. 24 is a flowchart that illustrates an example of the process in a case where the copy source storage apparatus 1A illustrated in FIG. 13 receives a write command. FIG. 25 is a diagram that illustrates a copy source writing process in the case of the synchronous mode, and FIG. 26 is a diagram that illustrates a copy source writing process in the case of the consistency mode.

Figure 25:
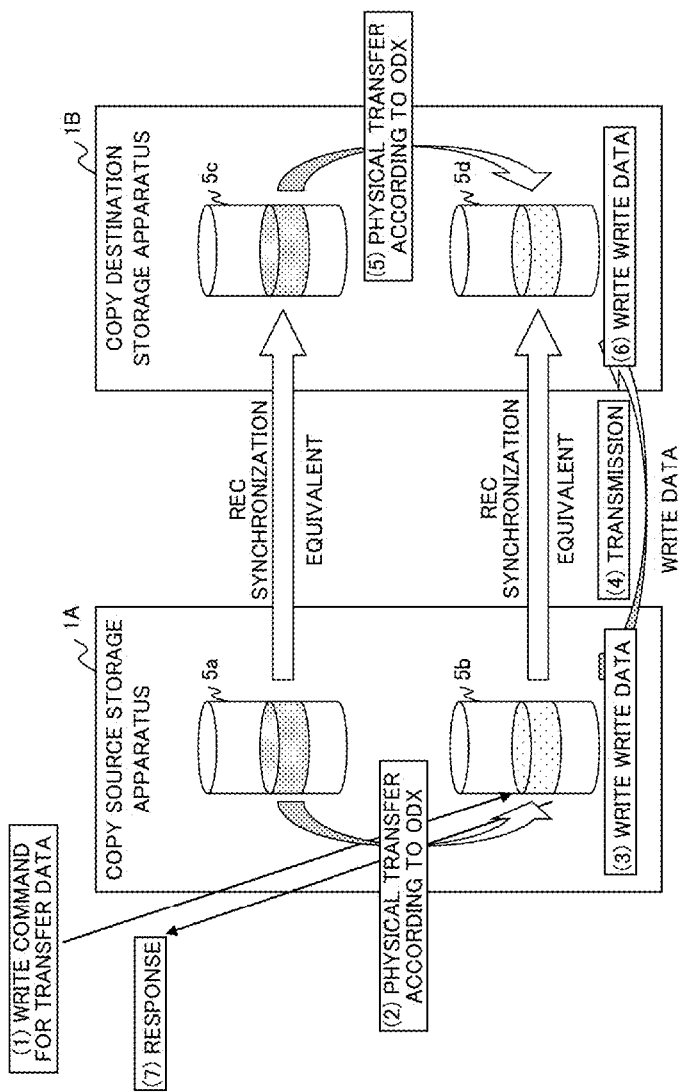
FIG. 25 is a diagram that illustrates a copy source writing process in the case of the synchronous mode.
Figure 26:
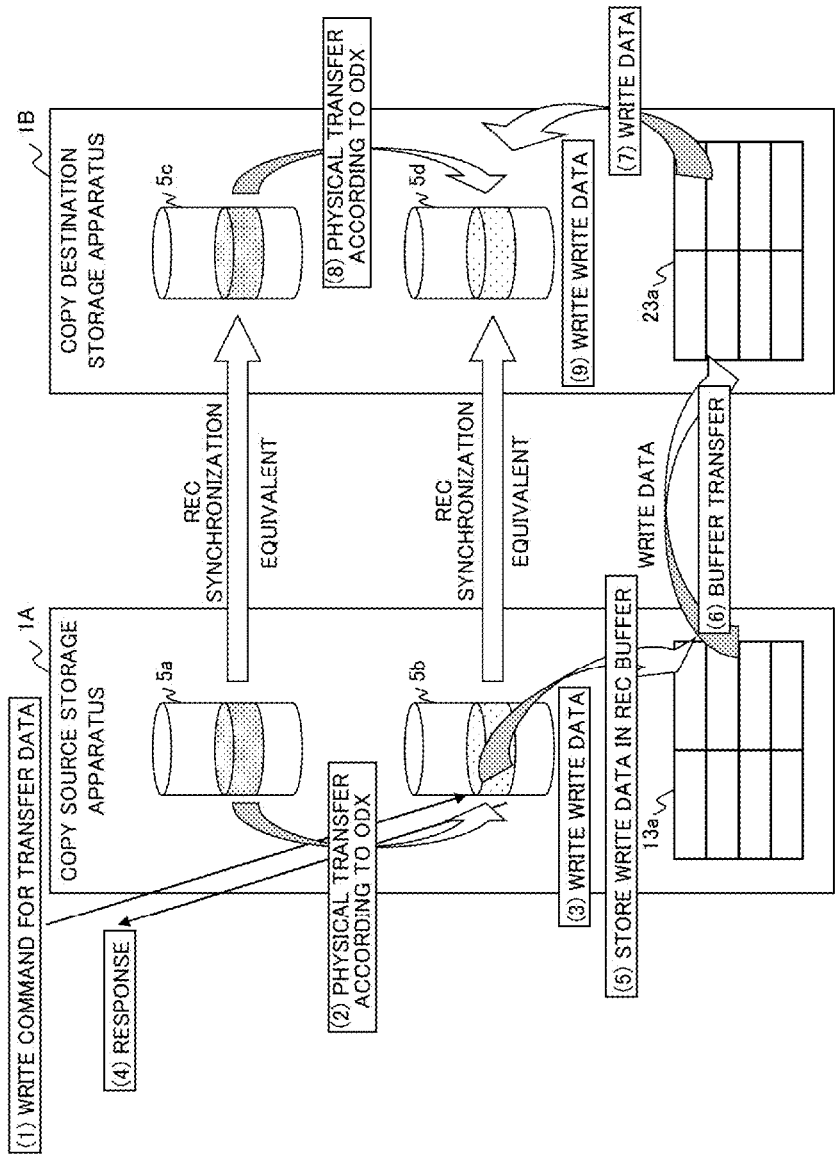
FIG. 26 is a diagram that illustrates a copy source writing process in the case of the consistency mode.

As illustrated in FIG. 24, when the write/read command controller 11a' of the copy source receives a write command from the host apparatus 2 in Step S81 (see arrow (1) represented in FIGS. 25 and 26), the session management unit 12 determines whether the writing area is the transfer destination of the ODX using the ODX session management unit 12a' in Step S82.

In a case where the writing destination (for example, the volume 5b) is the transfer destination of the ODX (Yes route of Step S82), the ODX session management unit 12a' performs physical transfer of the transfer data from the transfer source (volume 5a) according to the existing ODX to the volume 5b in Step S83 (see arrow (2) represented in FIGS. 25 and 26). In a case where the transmission has been completed or a case where the writing destination is not the transfer destination according to the ODX (No route of Step S82), the write/read command controller 11a' writes the write (update) data relating to the write command into the volume 5b in Step S84 (see arrow (3) represented in FIGS. 25 and 26).

Subsequently, the copy session management unit 12b' determines whether or not the copy mode is the synchronous mode in Step S85. In a case where the copy mode is the synchronous mode (Yes route of Step S85), the session management unit 12 transmits the write data to the storage apparatus 1B through the inter-device I/F controller 14 for transmitting the write data according to the REC in Step S86 (see arrow (4) represented in FIG. 25).

In addition, in the storage apparatus 1B, the ODX session management unit 22a' determines whether or not the volume 5 of the copy destination of the write data according to the REC is the transfer destination of the ODX in Step S87.

In a case where the copy destination (for example, the volume 5d) is the transfer destination of the ODX (Yes route of Step S87), the ODX session management unit 22a' performs physical transfer of the copy destination transfer data from the transfer source (volume 5c) according to the existing ODX to the volume 5d in Step S88 (see arrow (5) represented in FIG. 25). In a case where the transfer has been completed or a case where the copy destination is not the transfer destination according to the ODX (No route of Step S87), the inter-device I/F controller 24' writes the write data received in accordance with the REC into the volume 5d in Step S89 (see arrow (6) represented in FIG. 25).

In addition, the inter-device I/F controller 24' returns a response of the completion of the copy of the write data to the copy source storage apparatus 1A of the REC in Step S90. When the response of the completion of the copy is received from the copy destination, the storage apparatus 1A transmits a response to the write command to the host apparatus 2 using the write/read command controller 11a' in Step S91 (see arrow (7) represented in FIG. 25).

As above, the process in the case where the copy source storage apparatus 1A receives the write command in the case of the synchronous mode is completed.

On the other hand, in a case where the copy mode is not the synchronous mode (No route of Step S85), in other words, in the case of the consistency mode, the write/read command controller 11a' transmits a response to the write command to the host apparatus 2 in Step S92 (see arrow (4) in FIG. 26).

In addition, the copy session management unit 12b' transfers the write data to the REC buffer management unit 13'. The REC buffer management unit 13' stores the transferred write data into the REC buffer 13a in Step S93 (see arrow (5) represented in FIG. 26).

Then, the REC buffer management unit 13' starts the buffer transfer process in Step S94 (Steps S61 to S69 represented in FIG. 18).

In addition, in the buffer transfer process, as described above, the REC buffer management unit 13' reads the data (write data) stored in the REC buffer 13a at predetermined timing and is buffer-transferred to the copy destination (see arrow (6) represented in FIG. 26). Furthermore, the session management unit 22 of the copy destination reads the write data that has been buffer-transferred through the REC buffer management unit 23' from the REC buffer 23a (see arrow (7) represented in FIG. 26). In addition, the physical transfer of the copy destination transfer data from the transfer source (volume 5c) according to the existing ODX to the transfer destination (volume 5d) of the ODX that is the copy destination of the write data is performed (see arrow (8) represented in FIG. 26). Then, the inter-device I/F controller 24' reflects the write data on the copy destination of the REC (see arrow (9) represented in FIG. 26).

As above, the process performed in the case where the copy source storage apparatus 1A receives the write command in the case of the consistency mode is completed.

[3] Others

As above, while the preferred embodiments of the present invention have been described in detail, the present invention is not limited to such specific embodiments but may be variously modified or changed within a range not departing from the concept of the present invention.

For example, the functions of the copy source CM 3A described above may be integrated or distributed in accordance with an arbitrary combination. Similarly, the functions of the copy destination CM 3B may be integrated or distributed in accordance with an arbitrary combination.

In addition, regarding the above-described CMs 3, while the copy source has been described to include the function of the CM 3A, and the copy source has been described to include the function of the CM 3B, the CM 3 may include the functions of both the CMs 3A and 3B such that CM 3 can respond to any one of the copy source and the copy destination.

Figure 27:
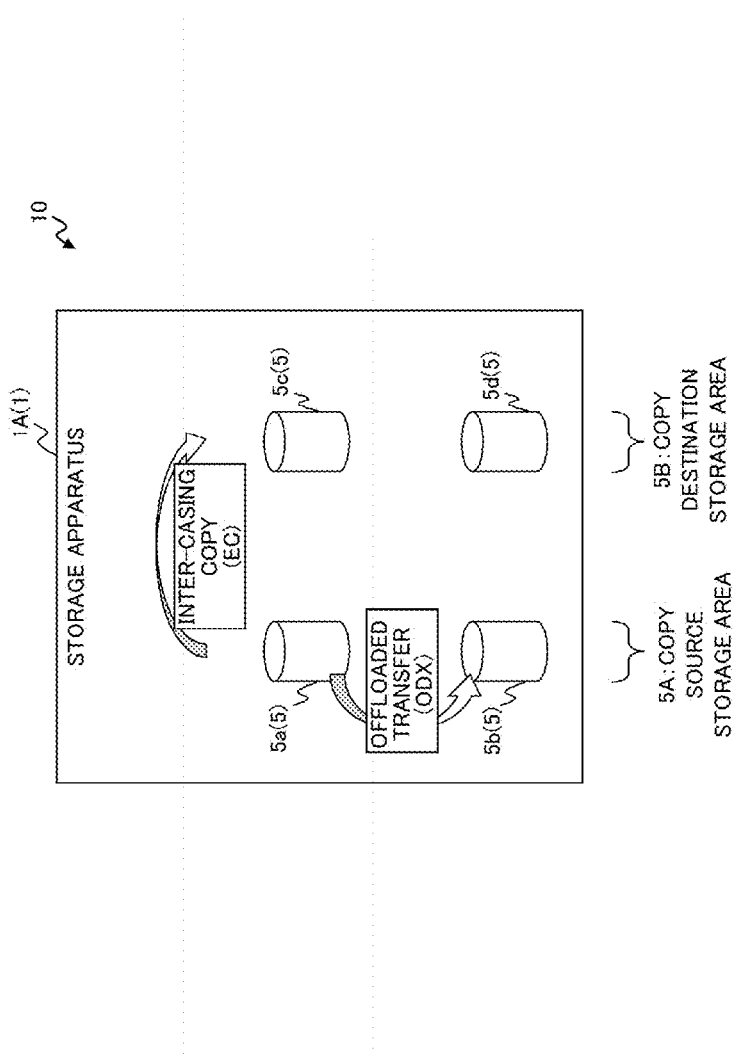
FIG. 27 is a diagram that illustrates an example of the form of a backup according to the storage system illustrated in FIG. 1.
Figure 28:
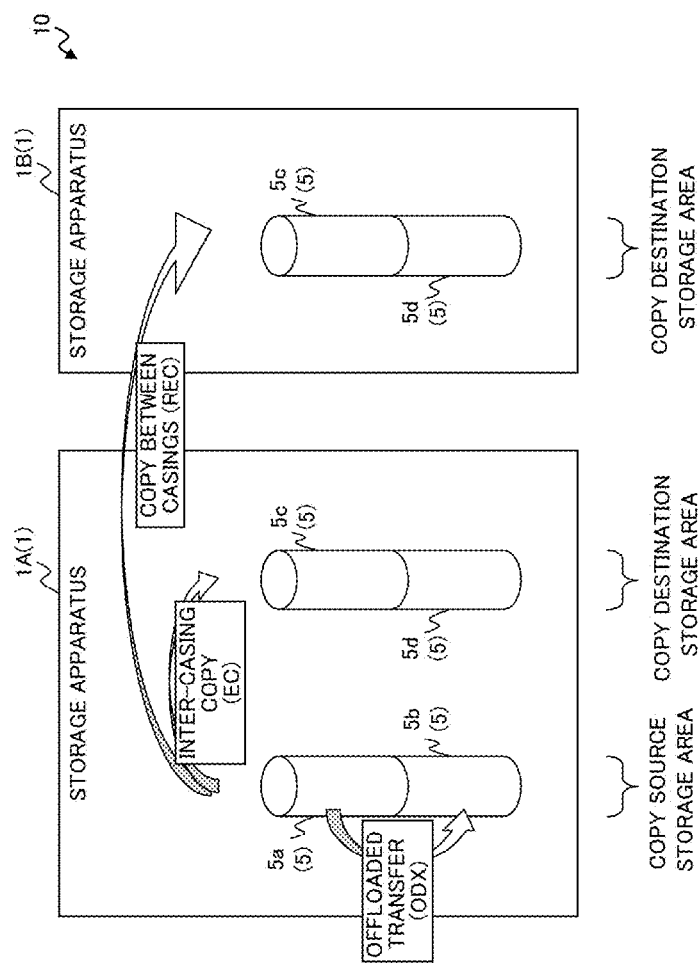
FIG. 28 is a diagram that illustrates an example of the forms of a backup according to the storage system illustrated in FIG. 1.
Figure 29:
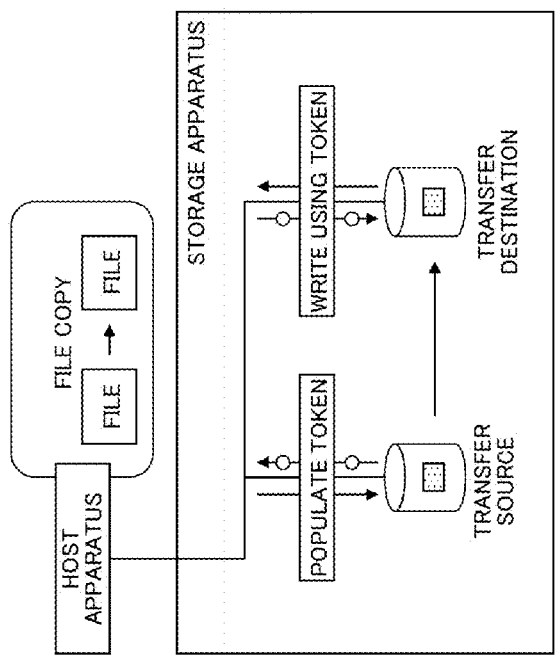
FIG. 29 is a diagram that illustrates an example of a data transfer process performed in a storage apparatus according to the ODX.
Figure 30:
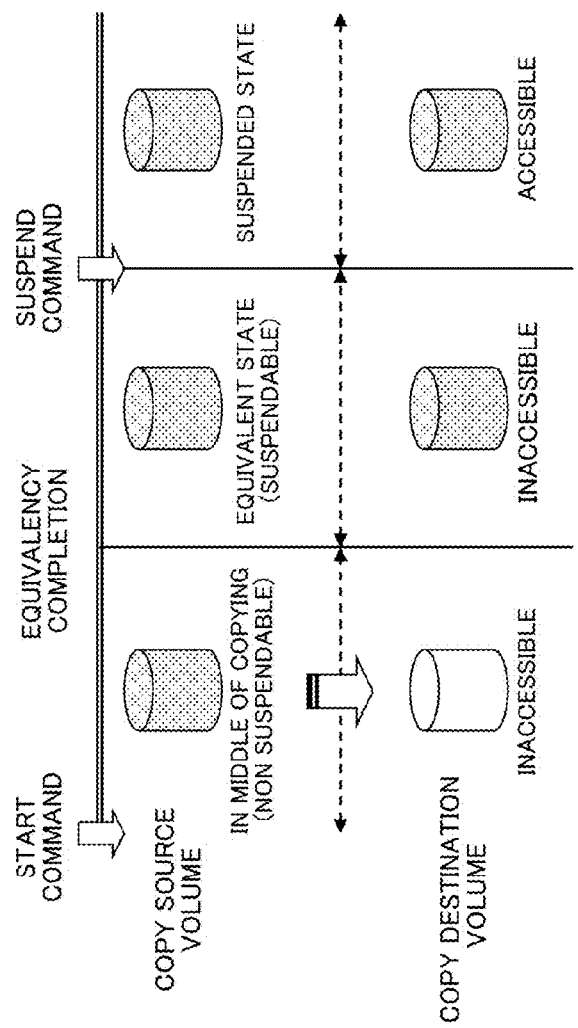
FIG. 30 is a diagram that illustrates an example of a data copy process according to the REC between storage apparatuses.

Furthermore, while the above-described storage system 10 has been described to perform a backup illustrated in FIG. 2, the present invention is not limited thereto, and, for example, a backup employing the form illustrated in FIG. 27 or 28 may be performed.

FIGS. 27 and 28 are diagrams that illustrate examples of the form of a backup according to the storage system 10 illustrated in FIG. 1.

As illustrated in FIG. 27, the storage system 10 may perform intra-casing copy such as an EC. In such a case, the copy source storage area 5A is one or more physical or logical volumes realized by the storage apparatus 41, and the copy destination storage area 5B is another one or more physical or logical volumes realized by the storage apparatus 41. In the storage apparatus 1A, one CM 3A may manage the copy source storage area 5A and the copy destination storage area 5B. Alternatively, two CMs 3A may respectively manage the copy source storage area 5A and the copy destination storage area 5B utilizing communication made through a direct memory access (DMA) port or the like. In a case where the backup illustrated in FIG. 27 is performed, in the storage apparatus 1A according to the second embodiment, the ODX session management unit 12a' may start a copy destination transfer process based on a copy destination transfer command issued by the copy session management unit 12b'.

Alternatively, as illustrated in FIG. 28, the storage system 10 may perform the ODX within one volume. Also in such a case, the first or second embodiment described above may be applied to the storage system 10.

All or some of the various functions of the CM 3 (storage controller) according to the first and second embodiments and modified examples thereof may be realized by executing a predetermined program (control program) using a computer (including a CPU, an information processing apparatus, and various terminals).

The program is provided in a form being stored (recorded) in a (non-transitory) computer-readable storage (recording) medium (for example, the storage medium 39b illustrated in FIG. 3) such as a flexible disk, a CD, a DVD, or a Blue-ray disc. Examples of the CD include a CD-ROM, a CD-R, and a CD-RW. In addition, examples of the DVD include a DVD-ROM, a DVD-RAM, a DVD-R, a DVD-RW, a DVD+R, and a DVD+RW. In addition, the program may be configured to be recoded in a storage apparatus (storage medium) such as a magnetic disk, an optical disc, a magneto-optical disk and be provided for a computer through a communication line from the storage apparatus.

According to the embodiments, a copy source can be restored based on data stored in a copy destination even in a case where the copy source is broken down after reception of a transfer command for giving an instruction to perform a transfer process of data within a copy source storage area in a storage apparatus that performs a copy process for copying data from the copy source to a storage area of the copy destination.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage controller comprising a processor, the processor configured to:
   perform a copy process in which data stored in a copy source storage area including one or more storage volumes is copied to a copy destination storage area including one or more storage volumes corresponding to the copy source storage area, the storage controller and the copy source storage area being included in a first storage apparatus, the copy destination storage area being included in a second storage apparatus which is different from the first storage apparatus;
   receive transfer control information for giving an instruction for transferring data stored in a first area of the copy source storage area to a second area of the copy source storage area from an information processing apparatus;
   start a transfer process in which transfer data from the first area is read and is written into the second area in accordance with reception of the transfer control information; and
   start copying the transfer data into a corresponding area of the copy destination storage area that corresponds to the second area in the copy process together with starting of the transfer process,
   the processor determines an operation mode of the copy process, when the operation mode of the copy process is a first operation mode, the processor
   copies transferable data that is at least a part of the transfer data that is transferable within a response time for the transfer control information, to the corresponding area within the response time in the copying which is started; and
   transmits a response including information relating to the transferable data to the information processing apparatus after completion of the transfer process of the transferable data and the copying of the transferable data, and
   when the operation mode of the copy process is a second operation mode, the processor
   stores the transferable data in a buffer within the response time in accordance with starting of the copying, the buffer being included in the storage controller;
   transmits the transferable data stored in the buffer to the second storage apparatus at predetermined timing; and
   transmits the response to the information processing apparatus after completion of the transfer process of the transferable data and storing of the transferable data in the buffer.

2. The storage controller according to claim 1, wherein the processor:
   reads the transferable data from the first area and writes the transferable data into the second area in the transfer process which is started;
   starts copying the transferable data into the corresponding area in a starting process of the copying; and
   transmits the response and receives new transfer control information for giving an instruction for transferring data stored in an area for which transferring has not been performed in the first area to the second area from the information processing apparatus.

3. A storage controller comprising a processor, the processor configured to:
   perform a copy process in which data stored in a copy source storage area including one or more storage volumes is copied to a copy destination storage area including one or more storage volumes corresponding to the copy source storage area, the storage controller and the copy source storage area being included in a first storage apparatus, the copy destination storage area being included in a second storage apparatus which is different from the first storage apparatus;
   receive transfer control information for giving an instruction for transferring data stored in a first area of the copy source storage area to a second area of the copy source storage area from an information processing apparatus;

start a transfer process in which transfer data from the first area is read and is written into the second area in accordance with reception of the transfer control information; and start copying the transfer data into a corresponding area of the copy destination storage area that corresponds to the second area in the copy process together with starting of the transfer process, the processor performs the copy process in which data stored in the first area is copied to a third area of the copy destination storage area and data stored in the second area is copied to a fourth area that is the corresponding area of the copy destination storage area;

issues copy destination transfer control information for giving an instruction for transferring copy destination transfer data corresponding to the transfer data stored in the third area to the fourth area in a starting process of the copying; and transmits a response for the transfer control information to the information processing apparatus after completion of a starting process of the transfer process and issuing of the copy destination transfer control information, the processor determines an operation mode of the copy process, when the operation mode of the copy process is a first operation mode, the processor transmits the copy destination transfer control information to the second storage apparatus in the copying which is started; and transmits the response to the information processing apparatus after the completion of the starting process of the transfer process and a transmission of the copy destination transfer control information, and when the operation mode of the copy process is a second operation mode, the processor stores the copy destination transfer control information in a buffer in accordance with starting of the copying, the buffer being included in the storage controller;

transmits the copy destination transfer control information stored in the buffer to the second storage apparatus at predetermined timing; and transmits the response to the information processing apparatus after completion of the starting process of the transfer process and storing of the copy destination transfer control information into the buffer.

4. The storage controller according to claim 3, wherein, when a write command for the second area in which the writing of the transfer data is incomplete is received from the information processing apparatus, the processor writes write data relating to the write command into the second area after writing the transfer data into the second area.

5. A storage system comprising a copy source storage apparatus and a copy destination storage apparatus, the copy source storage apparatus including a storage controller, the storage controller including a first processor, the first processor configured to:

perform a copy process in which data stored in a copy source storage area including one or more storage volumes is copied to a copy destination storage area including one or more storage volumes corresponding to the copy source storage area the copy source storage area being included in the copy source storage apparatus, the copy destination storage area being included in the copy destination storage apparatus;

receive transfer control information for giving an instruction for transferring data stored in a first area of the copy source storage area to a second area of the copy source storage area from an information processing apparatus;

start a transfer process in which transfer data from the first area is read and is written into the second area in accordance with reception of the transfer control information; and start copying the transfer data into a corresponding area of the copy destination storage area that corresponds to the second area in the copy process together with starting of the transfer process, the first processor determines an operation mode of the copy process, when the operation mode of the copy process is a first operation mode, the first processor copies transferable data that is at least a part of the transfer data that is transferable within a response time for the transfer control information, to the corresponding area within the response time in the copying which is started; and transmits a response including information relating to the transferable data to the information processing apparatus after completion of the transfer process of the transferable data and the copying of the transferable data, and when the operation mode of the copy process is a second operation mode, the first processor stores the transferable data in a buffer within the response time in accordance with starting of the copying, the buffer being included in the storage controller;

transmits the transferable data stored in the buffer to the copy destination storage apparatus at predetermined timing; and transmits the response to the information processing apparatus after completion of the transfer process of the transferable data and storing of the transferable data in the buffer.

6. The storage system according to claim 5, wherein the first processor:

reads the transferable data from the first area and writes the transferable data into the second area in the transfer process which is started;

starts copying the transferable data into the corresponding area in a starting process of the copying; and transmits the response to the information processing apparatus and receives a new transfer control information for giving an instruction for transferring data stored in an area for which transferring has not been performed in the first area to the second area from the information processing apparatus.

7. A non-transitory computer-readable storage medium having stored therein a control program for causing a computer to execute a process, the process comprising:

performing a copy process in which data stored in a copy source storage area including one or more storage volumes is copied to a copy destination storage area including one or more storage volumes corresponding to the copy source storage area, the computer and the copy source storage area being included in a first storage apparatus, the copy destination storage area being included in a second storage apparatus which is different from the first storage apparatus;

receiving transfer control information for giving an instruction for transferring data stored in a first area of the copy source storage area to a second area of the copy source storage area from an information processing apparatus;

starting a transfer process in which transfer data from the first area is read and is written into the second area in accordance with reception of the transfer control information; and starting copying the transfer data into a corresponding area of the copy destination storage area that corresponds to the second area in the copy process together with the starting of the transfer process, the process comprises determining an operation mode of the copy process, when the operation mode of the copy process is a first operation mode, the process comprises copying transferable data transferable data that is at least a part of the transfer data that is transferable within a response time for the transfer control information, to the corresponding area within the response time in the copying which is started; and transmitting a response including information relating to the transferable data to the information processing apparatus after completion of the transfer process of the transferable data and the copying of the transferable data, and when the operation mode of the copy process is a second operation mode, the process comprises storing the transferable data in a buffer within the response time in accordance with the starting of the copying, the buffer being included in the computer;

transmitting the transferable data stored in the buffer to the second storage apparatus at predetermined timing, and transmitting the response to the information processing apparatus after completion of the transfer process of the transferable data and the storing of the transferable data in the buffer.

8. The non-transitory computer-readable storage medium according to claim 7, wherein the process further comprises:

reading the transferable data from the first area and writing the transferable data into the second area in the transfer process which is started;

starting copying the transferable data into the corresponding area in a starting process of the copying;

transmits the response to the information processing apparatus; and receiving a new transfer control information for giving an instruction for transferring data stored in an area for which transmission has not been performed in the first area to the second area from the information processing apparatus.

* * * * *